US012616095B2

(12) United States Patent　　　　　(10) Patent No.:　US 12,616,095 B2
Cazenave　　　　　　　　　　　　　　　(45) Date of Patent:　　May 5, 2026

(54) PRIMARY EXTRACTOR OF A SUGARCANE HARVESTER INCLUDING VARIABLE ANGLE GUIDE VANES

(71) Applicant: DEERE & COMPANY, Moline, IL (US)

(72) Inventor: Blain J. Cazenave, Vacherie, LA (US)

(73) Assignee: Deere & Company, Moline, IL (US)

( * ) Notice: Subject to any disclaimer, the term of this patent is extended or adjusted under 35 U.S.C. 154(b) by 422 days.

(21) Appl. No.: 18/212,417

(22) Filed: Jun. 21, 2023

(65) Prior Publication Data

US 2024/0423129 A1　　Dec. 26, 2024

(51) Int. Cl.
*A01D 45/10*　　　(2006.01)
*A01D 41/12*　　　(2006.01)

(52) U.S. Cl.
CPC ......... *A01D 45/10* (2013.01); *A01D 41/1243* (2013.01)

(58) Field of Classification Search
CPC ................ A01D 33/02; A01D 41/1276; A01D 41/1243; A01D 43/077; A01D 45/10; A01F 29/12
See application file for complete search history.

(56) References Cited

U.S. PATENT DOCUMENTS 5,092,110 A　*　3/1992　Dommert ............... A01D 45/10
　　　　　　　　　　　　　　　　　　　　　　56/16.5
6,457,295 B1　10/2002　Arnold 11,547,050 B1 *　1/2023　Hansen ................. F04D 29/644
2015/0327438 A1 *　11/2015　Cazenave .............. A01D 45/10
　　　　　　　　　　　　　　　　　　　　　　56/51
2019/0037770 A1 *　2/2019　Dugas .................... A01D 45/10
2020/0137958 A1 *　5/2020　Hansen ................... A01F 11/00
2022/0217908 A1 *　7/2022　Cazenave ............. F04D 27/007
2024/0175440 A1 *　5/2024　Lucca .................... A01D 45/10
2024/0397874 A1 *　12/2024　Cleodolphi ........... A01F 12/444

FOREIGN PATENT DOCUMENTS

WO　　WO-2020241395 A1 * 12/2020　............. A01D 45/10

* cited by examiner

*Primary Examiner* — Adam J Behrens

(74) *Attorney, Agent, or Firm* — Taft Stettinius & Hollister LLP; Stephen F. Rost

(57)　　　　　　　　ABSTRACT

A sugarcane harvester configured to cut sugarcane into a sugarcane mat having crop debris and billets. The harvester includes an extractor configured to receive the sugarcane mat at an inlet and to discharge crop debris from the sugarcane mat at an outlet. An extractor located between the inlet and the outlet includes an extractor fan having fan blades and a vane assembly including a plurality of guide vanes, wherein the angle of the guide vanes is adjustable. A selector includes a manual position to enable adjustment of a rotational speed of the fan blades and an automatic position which automatically adjusts the rotational speed of the fan blades. A controller identifies the position of the selector, and in response to the position of the selector adjusts the angle of the guide vanes to optimize fan performance for cleaning and fuel savings.

19 Claims, 12 Drawing Sheets

PRIMARY EXTRACTOR OF A SUGARCANE HARVESTER INCLUDING VARIABLE ANGLE GUIDE VANES

FIELD OF THE DISCLOSURE

The present invention generally relates to a harvesting machine, and more particularly to a system and method for harvesting sugarcane with a sugarcane harvesting machine.

BACKGROUND

Agricultural equipment, such as a tractor or a self-propelled harvester, includes mechanical systems, electrical systems, hydraulic systems, and electro-hydraulic systems, configured to prepare fields for planting or to harvest crops.

Harvesters of various configurations, including sugarcane harvesters, have harvesting systems of various types. Harvesting systems for a sugarcane harvester, for example, include assemblies or devices for cutting, chopping, sorting, transporting, etc., and otherwise gathering and processing sugarcane plants. Typical harvesting assemblies, in different implementations, include a base cutter assembly (or "base cutter"), feed rollers, cutting drums, stalk collectors, and extractor fans etc.

To actively harvest crops, the sugarcane harvester gathers and processes material from rows of sugarcane plants. In the case of one type of sugarcane harvester, the gathered sugarcane stalks are cut into billets that move through a loading elevator to an elevator discharge, where the cut sugarcane billets are discharged to a collector, such as the sugarcane wagon. Leaves, trash, and other debris are separated from the billets and ejected onto the field.

In various harvesters, harvesting assemblies are hydraulically powered by an engine-driven pump or electrically powered by a generator or other electrical power supply. The harvesting assemblies include rotating drums that move the cut stalks toward a chopper. The rotating drums are driven by a hydraulic motor or an electric motor that rotationally drives the roller to continuously move the billets to a fan for processing, and once processed, to the wagon or other container. The motors include splines that engage the roller to drive the roller about a rotational axis.

The sugarcane, once cut, forms what is known as a "mat" of sugarcane. The sugarcane harvester feeds the mat to a chopping section where it is chopped, including the stalk which is cut into segments. The sugarcane harvester advances the billets along with crop residue (e.g., leafy material, such as leaves, roots, and field debris etc.) to a primary extractor that separates at least a portion of the crop residue from the billets. The primary extractor includes a fan assembly having a motor and blades to clean the sugarcane, that is, to remove the crop residue from the sugarcane billets. The removed crop residue is discharged to the ground or to a collection wagon.

The primary extractor fan assembly is noted for consuming large amounts of power generated by the sugarcane harvester. For instance, currently known primary extractor fans include various inefficiencies that reduce the fans ability to efficiently use supplied power. Such inefficiencies can prevent the fan from operating efficiently under all field operating conditions. Cleaning of the sugarcane mat is highly load dependent, and is heavily affected by field conditions, such as crop density, crop moisture, and harvesting speeds, etc. These and other field conditions can affect throughput of billets through the cleaning chamber where the primary extractor fan assembly is located. Consequently, the amount of billets, as determined by the number of tons per hour, can change dramatically from field to field as well as within a field itself. Depending on the load being experienced by the primary extractor fan, the efficiency of the fan, which is dependent on fan speed and/or air flow, changes during cleaning of the incoming mat and therefore, so does the power consumption of the fan.

Depending on the efficiency of the primary extractor fan assembly, some billets are discharged at the output of the primary extractor instead of being moved to an elevator for discharge into a wagon or other container to be hauled away. In different implementations, the sugarcane harvester includes a secondary extractor that separates crop residue from the billets and discharges the separated crop residue from the sugarcane harvester. The secondary extractor includes a fan assembly having a motor and blades to discharge the crop residue from the harvester to the ground or to a collection wagon. The discharged billets are typically lost and are known as "field losses." These losses add up over the harvesting season and the amount of losses, if weighed, can be in the tons. Such losses are basically money that is left in the field.

Some primary extractor fan assemblies include fixed position inlet vanes that adjust the inlet airflow directed to the fan blades of the primary extractor. The adjusted inlet airflow is intended to enhance the efficiency of billet extraction. The fixed positions of the inlet vanes, however, can produce additional inefficiencies under certain circumstances, including affecting cane mat loads, crop tonnage, and field conditions. Factors such as cane mat loads, crop tonnage, and field factors, affect machine operation such as fan RPM and consequently cleaning of the harvested sugarcane.

What is needed therefore is a sugarcane harvester including a primary extractor fan assembly that efficiently and effectively removes crop residue from the billets, without removing an excessive amount of billets.

SUMMARY

In one implementation, there is provided a crop separator configured to process sugarcane including a housing having an inlet and an outlet wherein the inlet is configured to receive a sugarcane mat, having crop debris and billets, and the outlet is configured to receive crop debris. A fan assembly is located in the housing, wherein the fan assembly includes a plurality of fan blades coupled to a spindle. A motor is configured to rotate the plurality of fan blades about a rotational axis of the spindle. A vane assembly includes an actuator system and a plurality of guide vanes operatively connected to the actuator system, wherein the actuator system is adapted to adjust an angle of each of the plurality of guide vanes. A controller is operatively connected to the motor and to the vane assembly. The controller includes a processor and a memory, wherein the memory is configured to store program instructions and the processor is configured to execute the stored program instructions to: identify a rotational speed of the plurality of fan blades; identify an angle of incidence of the plurality of fan blades; identify an angle of attack of the plurality of fan blades based on the identified rotational speed of plurality of fan blades and the identified angle of incidence of the plurality of fan blades; and adjust the angle of the each of the plurality of guide vanes to optimize fan performance for cleaning and fuel savings.

In some implementations, the crop separator includes wherein the motor rotates the plurality of blades to generate a rotational air flow in a first direction.

In some implementations, the crop separator includes wherein the stored program instruction of the adjust the angle of each of the plurality of guide vanes includes adjust the angle to a position generating an air flow in a direction the same as or opposite to the rotational air flow in the first direction.

In some implementations, the crop separator includes a user actuator, wherein the user actuator includes manual position and an automatic position.

In some implementations, the crop separator includes wherein the manual position enables an operator to manually select the fan speed.

In some implementations, the crop separator includes wherein in response to the manually selected fan speed, the processor accesses a lookup table stored in memory that identifies a vane pitch angle associated with the selected fan speed.

In some implementations, the crop separator includes wherein when upon selection of the automatic position, the controller, based on the identified blade angle of incidence, adjusts the vane angle to the identified vane angle.

In some implementations, the crop separator includes wherein the processor, in response to selection of the manual position to select a fan speed, identifies a static fan blade speed and accesses a lookup table stored in memory that identifies a vane angle associated with the static fan blade speed.

In some implementations, the crop separator includes wherein the automatic position enables the controller to engage an auto clean operation which provides automatically adjusted fan speed based on a cleanliness of billets.

In some implementations, the crop separator includes wherein the processor is configured to execute the stored program instructions to adjust the angle of incidence of one or more of the plurality of fan blades based on the automatically adjusted fan speed and a power consumption range.

In another implementation there is provided a sugarcane harvester for harvesting sugarcane including a cutter configured to cut sugarcane into a sugarcane mat having crop debris and billets. An extractor is operatively connected to the cutter wherein the extractor includes a fan housing having an inlet configured to receive the sugarcane mat and an outlet configured to discharge crop debris from the sugarcane mat. A fan is located in the fan housing to move the sugarcane mat through the fan housing, wherein the fan includes a motor and fan blades rotatably coupled to the motor. A vane assembly includes an actuator system and a plurality of guide vanes operatively connected to the actuator system, wherein the actuator system is adapted to adjust an angle of each of the plurality of guide vanes. An elevator is operatively connected to the extractor to discharge billets from the extractor. A user interface includes user selectable controls, wherein the user selectable controls includes a manual position to enable an operator to manually adjust a rotational speed of the fan blades and an automatic position for automatically adjusting rotational speed of the fan blades. A controller is operatively connected to the user interface, the motor, and to the blade angle of incidence mechanism. The controller includes a processor and a memory, wherein the memory is configured to store program instructions and the processor is configured to execute the stored program instructions to: identify a rotational speed of the fan blades; and adjust the angle of the each of the plurality of guide vanes to optimize fan performance for cleaning and fuel savings based on the identified rotational speed of the fan blades.

In some implementations, the sugarcane harvester includes wherein the processor, in response to selection of the manual position of one of the blade angle of incidence or the fan blade speed, identifies the other of the blade angle of incidence or the fan blade speed and accesses a lookup table stored in the memory that identifies a vane angle associated with the static fan blade speed.

In some implementations, the sugarcane harvester includes wherein the manual position enables an operator to manually select the fan speed.

In some implementations, the sugarcane harvester includes wherein in response to the manually selected fan speed, the processor accesses a lookup table stored in the memory that identifies a vane angle associated with the selected fan speed and the controller, based on the identified vane angle, adjusts the vane angle to the identified vane angle.

In some implementations, the sugarcane harvester includes wherein the automatic position enables the controller to engage an auto clean operation which provides an automatically adjusted fan speed based on a cleanliness of billets.

In some implementations, the sugarcane harvester includes wherein the processor is configured to execute the stored program instructions to: adjust the angle of incidence of one or more of the plurality of fan blades based on the automatically adjusted fan speed and a power consumption range.

In a further implementation, there is provided a method of harvesting sugarcane from a field with a sugarcane harvester. The method includes: cutting sugarcane from the field to obtain a sugarcane mat of cut stalk and crop residue; delivering the cut stalk and the crop residue to a fan housing of the sugarcane harvester, wherein the fan housing supports an extractor fan having fan blades; identifying a position of a user actuator, wherein the user actuator includes a manual position and an automatic position; determining the rotational speed of fan blades of the extractor fan; and if the user actuator is in the manual position, adjusting an angle of one or more of a plurality of adjustable guide vanes based on the rotational speed of the extractor fan or adjusting the rotational speed of the fan blades if the guide vanes are static vanes.

In some implementations, the method includes wherein if the user actuator is in the automatic position, adjusting one of or both of an angle of incidence of the fan blades or a fan RPM of the fan blades of the extractor fan, and based on the adjusted angle of incidence of the fan blades and the adjusted fan RPM, adjusting an angle of a plurality of guide vanes.

In some implementations, the method includes wherein if the user actuator is in the automatic position, adjusting the rotational speed of the extractor fan based on a cleanliness of billets.

In some implementations, the method includes wherein if the user actuator is in the manual position, the manual position enables an operator to manually select the fan speed and upon selection of the fan speed, adjusting an angle of the guide vanes based on the selected fan speed and the adjusted angle of incidence of the fan blades.

BRIEF DESCRIPTION OF THE DRAWINGS

The above-mentioned aspects of the present invention and the manner of obtaining them will become more apparent and the invention itself will be better understood by reference to the following description of the implementations of the invention, taken in conjunction with the accompanying drawings.

DETAILED DESCRIPTION

Figure 1:
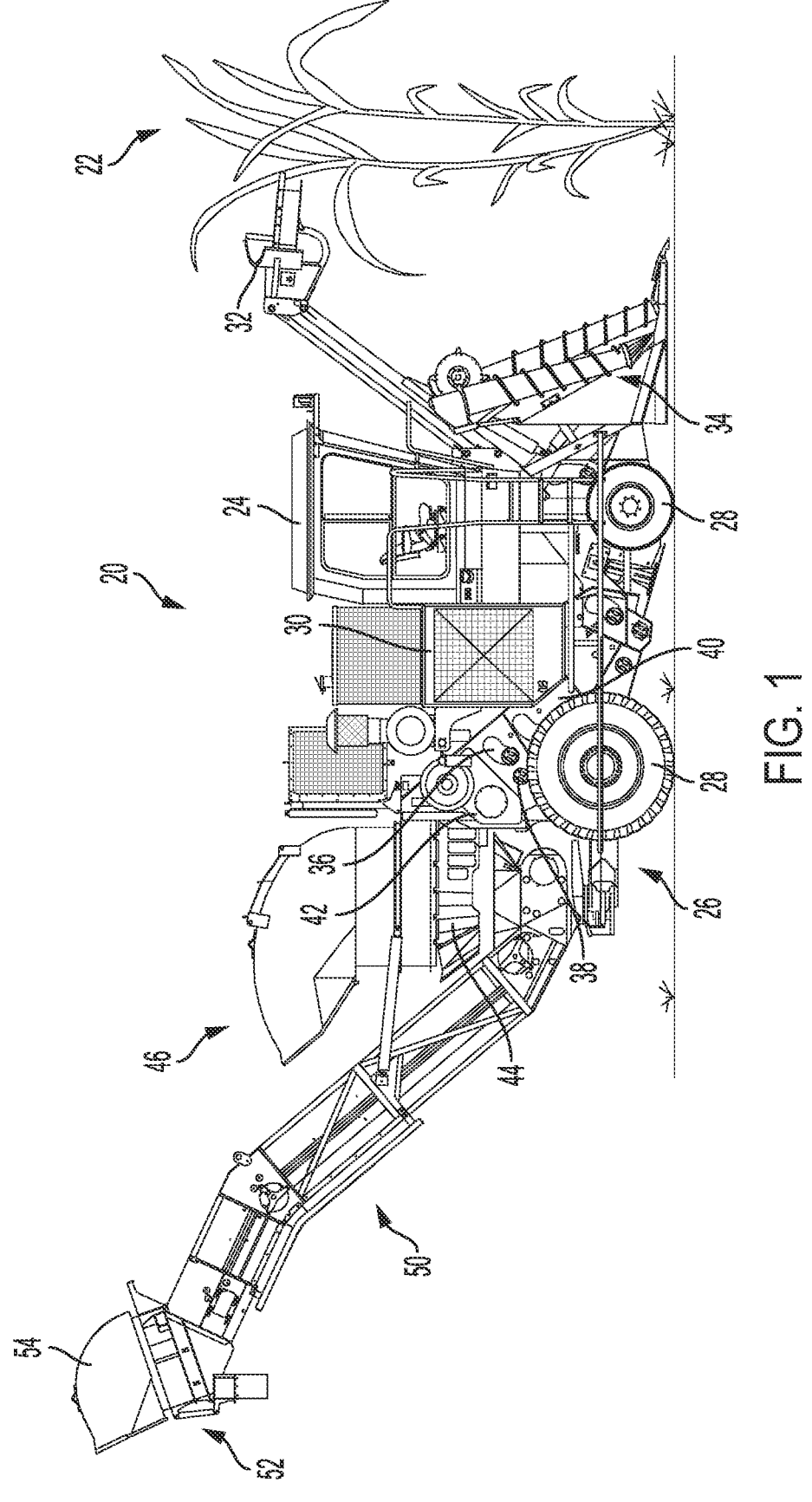
FIG. 1 illustrates a side elevational view of a work vehicle, and more specifically, of an agricultural vehicle such as a sugarcane harvesting machine.

For the purposes of promoting an understanding of the principles of the novel invention, reference will now be made to the implementations described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

The present application is related to application Ser. No. 17/147,526 having a priority date of Jan. 13, 2021, and having the title of Automated Adjustable Angle of Incidence Fan for Cleaning Sugarcane, the disclosure of which is incorporated herein by reference in its entirety.

FIG. 1 illustrates a side view of a sugarcane harvester 20 adapted to cut sugarcane 22, with the front of the harvester 20 facing to the right. Accordingly, certain components of the harvester 20 may not be visible in FIG. 1. The harvester 20 includes a cab 24 located on a main frame 26 that is supported by wheels 28 configured to move the harvester along rows of sugarcane 22. An engine is located within a housing 30 that moves the wheels 28 along a field to continually cut the sugarcane 22 for harvesting. In different implementations, the engine also powers various driven components of the harvester 20. In certain implementations, the engine directly powers one or more hydraulic pumps (not shown) and other driven components powered by the hydraulic motors via an embedded hydraulic system (not shown).

A cane topper 32 extends forward of the frame 26 in order to remove the leafy tops of sugarcane plants 22. A set of crop dividers 34 guides the stalks of sugarcane toward internal mechanisms of the harvester 20 for processing. As the harvester 20 moves across a field, sugarcane plants passing between the crop dividers 34 are deflected downward by one or more knockdown rollers before being cut near the base of the plants 22 by a base cutter assembly, as would be understood by one skilled in the art. Rotating disks, guides, or paddles (not shown) on the base cutter assembly further direct the cut ends of the plants upwardly and rearward within the harvester 20 toward successive pairs of upper feed rollers 36 and lower feed rollers 38. The feed rollers 36 and 38 are supported by a feed roller chassis 40 which is supported by the main frame 26. The upper and lower feed rollers 36 and 38 convey the stalks toward a chopper drum module 42 for chopping the stalks into billets.

The chopper drum module 42 includes upper and lower chopper drums that rotate in opposite directions in order to chop the moving stalks into billets, as would be understood by one skilled in the art. The billets, including crop residue, are propelled into a cleaning chamber 44 that is located at the base of a primary extractor 46. The primary extractor 46, in different implementations, includes a fan assembly including a powered fan to clean the billets and to extract the crop residue, trash, and debris from the cleaning chamber 44. A loading elevator 50, with a one end located at the bottom of the cleaning zone 44, conveys the cleaned billets upward to a discharge location 52, below a secondary extractor 54, where the billets are discharged into a truck, a wagon, a container, or other receptacle that collects the discharged billets. The secondary extractor 54 separates the crop residue from the cut stalk to clean the cut stalk.

Figure 2:
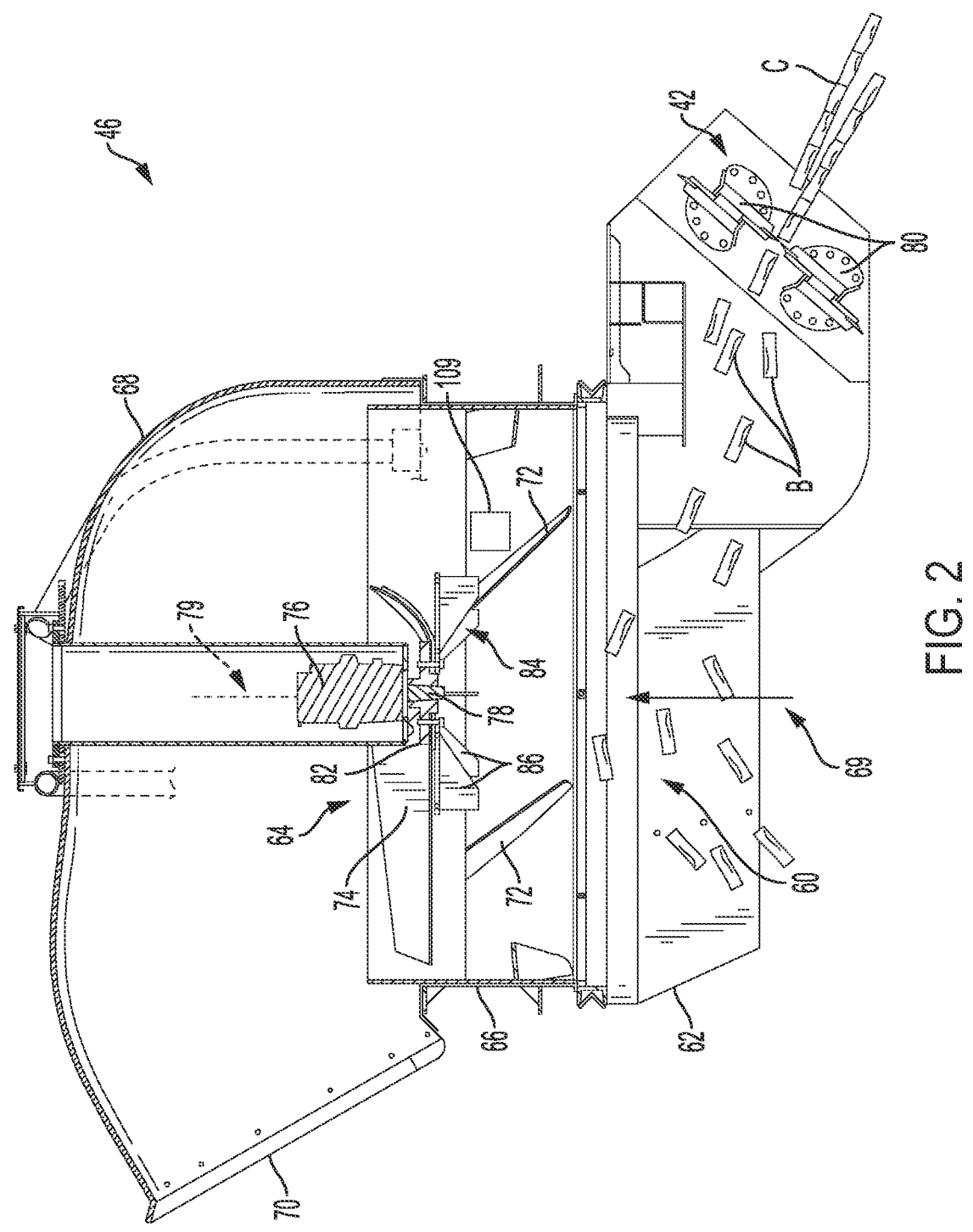
FIG. 2 illustrates a side sectional view of a primary extractor coupled to an elevator.

FIG. 2 illustrates a cross section through the chopper drum module 42 and the primary extractor 46. The chopper drum module 42 cuts the crop and the primary extractor 46 receives the cut crop from the chopper drum module 42 and generally separates the cut crop by way of a crop cleaner, which will be described in greater detail below. The crop cleaner may include any suitable mechanism for cleaning the cut crop, such as a fan (as in the illustrated construction that will be described below), a source of compressed air, a rake, a shaker, or any other mechanism that discriminates various types of crop parts by weight, size, shape, etc. in order to separate extraneous plant matter from billets. The primary extractor 46, in different implementations, includes any combination of one or more of a cleaning chamber 60, a cleaning chamber housing 62, a crop cleaner such as a fan assembly 64, a fan enclosure 66, and an extractor hood 68 having an opening 70. The fan enclosure 66 is coupled to the cleaning chamber housing 62 that in at least one implementation includes deflector vanes 72, which are fixed at a predetermined position with respect to the fan enclosure.

The fan assembly 64 includes a plurality of blades 74 driven by a fan motor 76 having a spindle 78 driving the fan blades 74. The angle of incidence of each of the fan blades 74 is adjustable relative an axis of rotation 79, i.e. motor axis (see FIG. 2), of the motor 76 that rotates the fan blades, which also defined by a housing 248 as further described with respect to FIG. 3. The fan motor 76 that drives the fan blades about the motor axis 79 is not illustrated in FIG. 3. As described herein, the position of the fan blades 74 with respect to the motor axis 79 of the fan motor 76 is an angle of incidence of the blades with respect to the incoming airstream. This is in contrast to the blade itself that has an inherent geometric pitch or "blade twist" which is identified from a hub of the blade to a tip of the blade. In one implementation as described herein, an airfoil type fan blade is used. Other types of blades are contemplated. Consequently, the implementations of the present disclosure include the use of different types of fan blades including but not limited to airfoil type blades (a variable pitch blade with a "twist"), variable radius blades, and constant radius blades. The angle of incidence is adjusted for all types of blades, regardless of the geometric pitch of the blade itself. Additional details of the fan assembly including adjustable fan blades are described in U.S. patent application Ser. No. 17/147,526, the disclosure of which is incorporated entirely by reference herein.

The chopper drum module 42 includes counter-rotating drum cutters 80 with overlapping blades for cutting the stalks of crop, such as cane C, into billets B, which are pieces of the stalk. In other constructions, the chopper drum module 42 includes any suitable blade or blades for cutting the stalks of crop. The crop also includes dirt, leaves, roots, and other plant matter, which will be collectively referred to herein as crop debris, which are also cut in the chopper drum module 42 along with the cane C. The chopper drum module 42 directs a stream of the cut crop (cut stalks, or billets B, and crop debris) to the cleaning chamber 60, which is generally defined by the cleaning chamber housing 62, the fan enclosure 66, and/or the extractor hood 68

The extractor hood 68, coupled to the fan enclosure 66, includes a domed shape, or other suitable shape, and includes the opening 70 angled out from the harvester 20 and facing slightly down onto a field. In some constructions, the opening 70 is generally perpendicular to the driveshaft 78. The hood 68 directs cut crop through the opening 70 to the outside of the harvester 20, e.g., for discharging a portion of cut crop removed from the stream of cut crop back onto the field.

The fan assembly 64 of FIG. 2 is an axial flow fan which is mounted in the cleaning chamber 60 to clean the sugarcane mat by separating the cut billets from the crop debris. In one implementation, the fan assembly 64 is in the form of an extractor fan having axial flow fan blades 74 radiating out from, and joined to, a motor hub 82. In the illustrated construction, the fan assembly 64 is configured to draw air and extraneous plant matter from the cleaning chamber 60. Inlet airflow 69 generally flows into the cleaning chamber 60 generally parallel to the motor axis 79.

In other implementations, the fan assembly 64 is configured to blow rather than extract, i.e., to blow or push the air through the cleaning chamber 60 to clean the sugarcane mat by measuring leaf content and/or billet loss. The fan assembly 64, in different implementations, includes other types of fans with other types of blades, such as a centrifugal fan, amongst others. In one or more implementations, a centrifugal blower wheel 84 is mounted for rotation with the fan blades 74 and includes a plurality of generally right-angular blower blades 86 that are fixed to the underside of the centrifugal blower wheel 84 radiating out therefrom.

The motor 76, such as a hydraulic motor, includes the drive shaft 78 operatively coupled to the fan blades 74. For example, the drive shaft 78 may be keyed to the hub 82 or operatively coupled in other suitable ways to drive the fan blades 74. The motor 76, in other implementations, is operatively coupled to drive the centrifugal blower wheel 84 in a similar manner. In other implementations, the motor 76 is electric, pneumatic, or any other suitable type of motor, engine, or a prime mover, to drive the fan blades 74 and/or the centrifugal blower wheel 84.

The function of the guide vanes 72 in the fan 64, i.e. an axial flow fan, is to reduce or eliminate the air spin in the airflow entering or exiting the fan blades 74 and in return reducing the rotational energy losses. Guide vanes can be placed either on the inlet or outlet side of the airflow depending on the application and duct geometry. As seen in FIG. 2, the guide vanes are located on the inlet side.

Recirculating debris becomes suspending in the upper cleaning chamber housing and extractor hood prior to being discharged from the opening 70. Under some conditions, the debris may fall from the upper cleaning chamber and into the incoming particle stream, which includes both debris and billets. The falling debris may interact/interfere with the incoming particle stream causing portions of the recirculating particle stream to drop out of the suspended matter. This falling debris may interfere with incoming debris/billet particles which can cause the debris to drop out of circulation into a collection basket, where it interferes with the collection of billets that are separated from the debris. This inefficient process increases motor operating pressures and reduces the capacity of the debris removal system. Therefore, preventing an inefficient extraction process. This in turn produces higher motor operating pressures and operating inefficiencies.

In one implementation, by placing the vanes on the outlet side of the fan, static pressure is increased, efficiency is increased. The outlet air spin is substantially reduced or substantially eliminated for quicker particle/debris extraction from the system by preventing turbulent air swirling in the outlet duct which reduces or prevents debris recirculation. This in turn reduces operating pressures and increases cleaning efficiencies. While placing the vanes on the inlet side prepares the airflow for the blades, it may not provide the result of increasing the static pressure/efficiency of the system when compared to placing the vanes on the outlet side.

Presenting the incoming air stream to the rotating fan blades in the correct orientation and/or air angle on the inlet side prevents or reduces the occurrence of eddies, air re-circulations, and turbulent flow at or near the flan blade, the fan hub, or both. Presenting the incoming airflow in a "corrected" or "optimized" angle to the rotating fan blades provides a smoother or less chaotic flow pattern as the air flow transitions from inlet to outlet flow. However, it does reduce air turbulence and chaotic flow, which in turns can reduce operating pressures. Also, just like the outlet guide vanes, inlet vanes can produce both axial and helical flow depending on the vane orientation.

Fixed inlet vanes reduce efficiency since the angle of fixed inlet vanes must also be directly correlated to the fan blade angle and/or pitch. In this case, the incoming air must be presented to the rotating fan blades at the proper angle or the blades will not operate as efficiently as desired and will not perform as expected for the given fan revolutions per minute. (RPM). Fixed or static vanes have a limited operating range for a given blade angle of incidence and fan RPM. Operating outside of the predetermined range can cause inefficiencies. Such a configuration can, under some circumstances, generate severe air turbulence, increase helical airflow hindering axial airflow, and reduce material extraction from the extractor system. Static inlet vanes only provide a correct airflow deflection for one point on a fan blade performance curve. At different fan speeds, the static inlet vanes cause the fan system to perform inefficiently which produces more air turbulence and higher fan horsepower.

Cane cleaning is load sensitive and fan speeds vary depending on crop tonnage and field conditions. Being able to adjust the angle of the vanes to match fan speed to optimize fan performance and reduce fan horsepower requirements is a tremendous advantage while optimizing air flow for better cleaning. The orientation and size of outlet guide vanes is not as critical as the inlet guide vanes, since they are only reducing the air spin exiting the fan system and contributing more to increasing the static pressure of the fan system therefore increasing the efficiency of the system. However, the angle of one or more of the outlet vanes is still very important and, if properly oriented in the fan housing, the static pressure gains can be increased to noticeable gains by reducing fan horsepower requirements.

Figure 3:
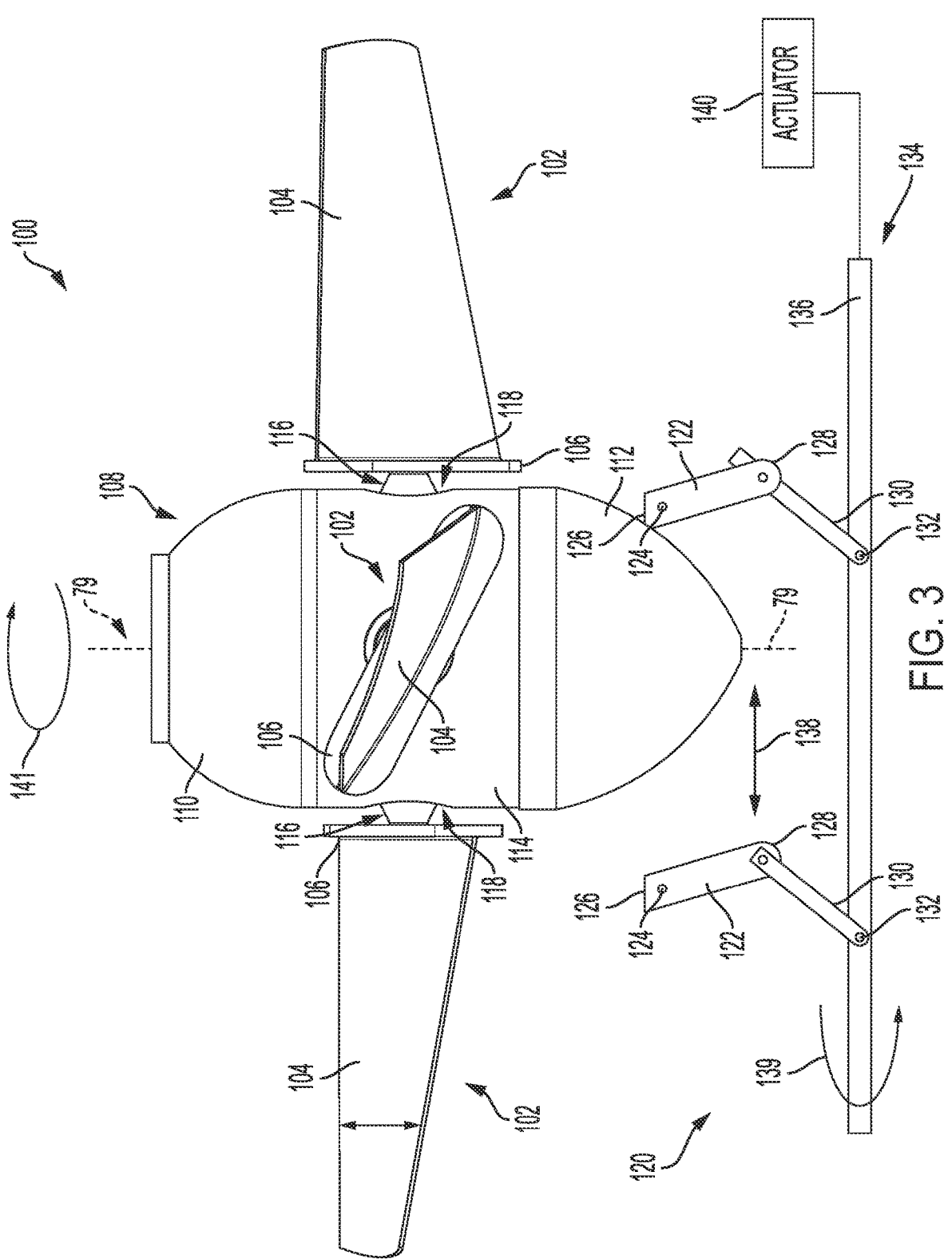
FIG. 3 illustrates an implementation of a fan assembly including a variable angle vane assembly.

Current primary extractor technology has inlet guide vanes that are fixed in the direction of the rotating fan blades thereby contributing to inlet helical airflow. Orientating the guide vanes in the opposite direction, as shown in FIG. 3, at the correct angle provides a "corrected" airflow to the fan blades thereby reducing fan horsepower, increasing fan efficiency, and creating optimal airflow for trash extraction. Consequently, as described herein an automated adjustable variable angle inlet and/or outlet guide vane system that correlates the guide vane angle to of a variable angle of incidence or fixed angle of incidence fan system is provided. As fan speeds change due to fan loading conditions, the angle of the vanes is adjusted to optimize fan performance for cleaning and for fuel savings. In another implementation, the extractor uses outlet guide vanes as described later herein. As used herein a fixed angle of incidence of fan blades is also known as a static angle of incidence.

As seen in FIG. 3, one implementation of a fan assembly 100 includes an adjustable variable angle inlet guide vane system. The fan assembly 100, also known as an extractor fan or extractor fan assembly, includes four adjustable fan blade assemblies 102, wherein three blade assemblies 102 are shown. In other implementations, different numbers of fan blade assemblies include, but are not limited to 3, 4, or 7. Each of blade assemblies 102 includes a fan blade 104 fixedly connected to and extending from a flange 106. Each of the fan blade assemblies 102 extends from a housing 108 having a top portion 110, a bottom portion 112, and a middle portion 114. The fan blade assemblies 102 further include a spindle 116 fixedly coupled to flange 106, each of which extends through an aperture 118. Other numbers of fan blade assemblies are contemplated.

An adjustable vane assembly 120 is located beneath the fan assembly 100 and is located within the fan enclosure 66 of FIG. 2. The adjustable vane assembly 120 includes one or more vanes 122, each of which is adjustable with respect to the motor axis 79 to adjust an angle of the vanes 122 with respect to the fan enclosure as well as with respect to the direction of airflow 69 of FIG. 2. Each of the vanes 122 is rotatably coupled to a support, such as the fan enclosure 66, about a pivoting connection 124 located at a first end 126 of the vane 122. A second end 128 of the vane 122 is pivotally connected to one end of an arm 130. The arm 130 includes a second end 132 pivotally connected to a vane adjustment mechanism 134. In one implementation, the vane adjustment mechanism 134 includes a bar 136 coupled to each of the second ends 132. In one implementation, the bar 136 moves in a left to right direction 138 which moves the second ends 128 of the vanes 122 about the fixed pivoting connections 124. Movement of the bar 136 in the left to right or right to left direction adjusts an angle of the guide vanes. 122 with respect to the motor axis 79.

In another implementation, the bar 136 is curved in a circular or semicircular fashion and follows the interior circumference of the housing 66. In other implementations, the bar is a continuous ring defining a circumference. The bar 136 is not shown to scale in FIG. 3 and other lengths are contemplated. Movement of the bar 136, when curved, moves in both a clockwise and a counterclockwise direction. By adjusting the position of the vanes 122, an airflow 139 moves in a direction determined by vane angle The vanes 122 direct the airflow in the indicated direction, which is opposite a direction of airflow 141 generated by the fan blades 104 rotating about the motor axis 79. Movement of the bar 136, in one implementation, is limited in either direction since large angles of rotation are not needed to affect a flow of air being directed by the adjustable vanes. For instance, in one implementation, rotation of the bar 136 about the axis 79 is about ten degrees. Other angles of rotation are contemplated. An actuator motor 140 is connected to the bar 136 to adjust its position.

Figure 4:
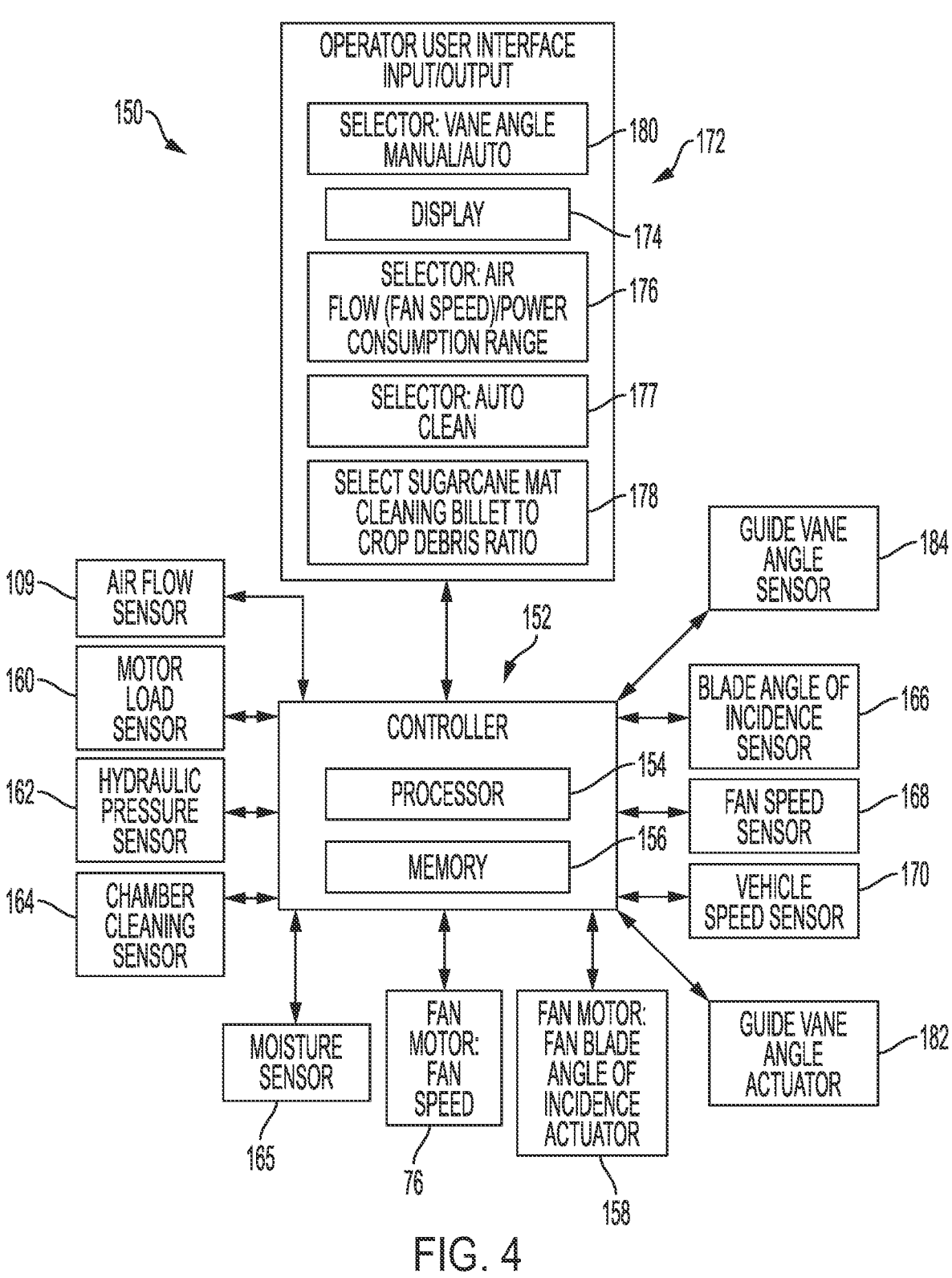
FIG. 4 illustrates a schematic block diagram of a control system of a work vehicle.

FIG. 4 illustrates a schematic block diagram of a control system 150 of the vehicle 20 configured to clean the sugarcane mat based on the composition of the mat that can include varying amounts of sugarcane billets and crop debris, such as leaf content. Each field of sugarcane can have different varieties of sugarcane, which not only varies in height, but also varies in stalk diameter, moisture content, and leafy material. Because the size, shape, and weight of the billets being cut from sugarcane can vary over a wide range, the control system 150 is configured to adapt to various field operating conditions with variable billet throughput. In one implementation, the position of the fan blades with respect to the motor axis 79 is adjusted based on the amount of billets being separated from the incoming sugarcane mat based on fan loading and based on power consumption limits set by the user. The control system 150 determines fan loading and adjusts the fan speed and adjusts an angle of incidence of the blades with respect to the motor axis 79 to optimize billet separation and fan loading. For instance, in some cases there is a tradeoff between power consumption of the system versus an amount of extraneous matter/crop debris separated from the incoming sugarcane mat.

In generally known extraction systems, to increase the extraction of extraneous matter/crop debris from the incoming sugarcane mat, additional horsepower is required to operate the fan, which increases fuel costs, and increases fan loading. Higher fan speeds tend to clean the sugarcane mat more effectively, but more field losses occur at the higher speeds, which leads to higher power consumption. Consequently, there is a tradeoff between the amounts of billet losses versus the amount of crop residue.

To optimize billet extraction and to reduce fuel consumptions, the control system 150 includes a controller 152, including a processor 154 and a memory 156, configured to optimize a rotational speed of the fan motor 76 of fan assembly 64, to adjust the angle of incidence of fan blades 74, and to adjust an angle of the vanes 122. The angle of the vanes is referenced with respect to the housing 66.

The angle of incidence for the fan blades 104 is adjusted by a fan blade angle of incidence actuator, or mechanism, 158 of FIG. 4.

The ability to adjust the angle of incidence of the fan blades during crop harvesting while cleaning the crop mat enables the fan blades to perform within an intended optimal range of the angle of incidence of the fan blades 104. This optimal range increases fan efficiency and air flow distribution throughout the cleaning chamber 60. The proposed operational range of cleaning efficiency balanced by billet loss is also influenced by and dependent on the blade geometry, the inherent blade pitch. Operating within the operational range increases fan efficiency and air flow distribution within the cleaning chamber 60. By improving air flow distribution in the cleaning chamber, more efficient residue extraction is achieved. As a result, power consumption is reduced which provides improved performance. Increasing fan efficiency by monitoring fan speed, adjusting fan speed, and adjusting fan blade angle of incidence within a predetermined operating range, improves performance, reduces fuel cost, increases residue extraction, and reduces billet losses. Being able to reduce fuel consumption while increasing fan performance and efficiency saves money by reducing fuel costs and reducing the amount of lost billets that are thrown out with the crop debris. Improved cleaning results and harvester performance is enhanced.

To achieve the desired extraction, the controller 152, in different implementations, includes a computer, computer system, or other programmable devices. In these and other implementations, the controller 152 includes one or more of the processors 154 (e.g. microprocessors). An associated memory 156 can be internal to the processor or external to the processor(s) 154. The memory 156 includes, in different implementations, random access memory (RAM) devices comprising the memory storage of the controller 152, as well as any other types of memory, e.g., cache memories, non-volatile or backup memories, programmable memories, or flash memories, and read-only memories. In addition, the memory can include a memory storage physically located elsewhere from the processing devices, and can include any cache memory in a processing device, as well as any storage capacity used as a virtual memory, e.g., as stored on a mass storage device or another computer coupled to controller 152. The mass storage device, in different implementations, includes a cache or other dataspace which can include databases. Memory storage, in other implementations, is located in a cloud system, also known as the "cloud", where the memory is located in the "cloud" at a distant location from the machine to provide the stored information wirelessly to the controller 152. An antenna is operatively connected to a transceiver (not shown), which is operatively connected to the controller 152. When referring to the controller 152, the processor 154, and the memory 156, other types of controllers, processors, and memory are contemplated.

The controller 152 executes or otherwise relies upon computer software applications, components, programs, objects, modules, or data structures, etc. Software routines resident in the included memory 156 of the controller 152, or other memory, are executed in response to the signals received from a plurality of sensors, each of which provides a signal to the controller 152 that identifies a state of a device or structure of the vehicle 20. An air flow sensor 109 is located in the hood 68 to determine a flow of air through the hood 68 (See FIG. 2). In the illustrated implementation, the air flow sensor 109 is located below the fan blades. Other locations are contemplated.

A motor load sensor 160 identifies a load experienced by the motor 76 during cleaning of the sugarcane mat. In one or more implementations, the motor load sensor 160 is a hydraulic pressure sensor that identifies motor loading of a hydraulic motor. Other types of motor load sensors are contemplated.

A chamber pressure sensor 162, located in the cleaning chamber 60, identifies a hydraulic pressure of a hydraulic circuit that operates the motor 76, if it is a hydraulic motor. In one or more implementations, the chamber pressure sensor 162 is a manometer that measures atmospheric pressures within the chamber, which are used to operate the variable angle of incidence fan. If an electric motor is used, the current supplied to the motor is identified. A chamber cleaning sensor 164, located in the cleaning chamber 60, identifies a cleaning extent of the sugarcane mat, i.e. which includes in different implementations a measured leaf content and/or a billet loss. Excessive cleaning can result in a low leaf content and a high billet loss. In one implementation, a residue detector is used to adjust fan speed based on the amount of residue detected. In this implementation, the cleanliness of the billets is determined, i.e. the amount of residue remaining in the cleaned billets. In one implementation, the chamber cleaning sensor 164 includes a video camera or other vision technology to determine billet content in the sugarcane mat being cleaned. In other implementations, a video camera to identify billet content is located at the elevator 50. In other implementations, an impact sensor is located in the hood 68 to detect impact of billets within the hood, which can be used to identify cleaning efficiency. A moisture sensor 165 detects a moisture content of the sugarcane mat and includes, in one implementation, an infrared sensor. Other moisture content sensors are contemplated. In an auto clean system, as described later herein, billet losses as well as crop residue are detected.

A blade angle of incidence sensor 166 provides an angle of incidence of the blade with respect to an axis of the drive shaft of 78. In one implementation, the blade angle of incidence sensor 166 is an encoder that is configured to measure blade angle of incidence. Other types of blade angle of incidence sensors are contemplated. A fan speed sensor 168 is operatively coupled to the motor 76 to determine rotational fan speed. A vehicle speed sensor 170 is identifies the vehicle ground speed as the vehicle traverses the sugarcane field. The vehicle ground speed determines, at least in part, the rate at which the sugarcane is cut, and the rate at which the sugarcane moves through the upper and lower feed rollers 36 and 38 that convey the stalks toward the chopper drum module 42 to chop the stalks into billets. Vehicle speed sensors include, but are not limited to a speedometer, radar, and a velocimeter.

The controller 152, in one or more implementations, also relies on one or more computer software applications that are located in the memory 156, external memory located on the vehicle, or memory located in the "cloud", where the cloud generally refers to a network storing data and/or computer software programs accessed through the internet. The executed software includes one or more specific applications, components, programs, objects, modules or sequences of instructions typically referred to as "program code". The program code includes one or more instructions located in memory and other storage devices which execute the instructions which are resident in memory, which are responsive to other instructions generated by the system, or which are provided at a user interface operated by the user.

A user interface 122 is configured to receive one or more inputs, typically provided by an operator, and to provide outputs to the controller 152, such as signals that provide operating instructions to the controller, or user outputs such as sound alerts or visuals displays, for instance. In one or more implementations, display 174, provides visual displays or indicators of vehicle status, vehicle operating status or conditions. A selector 176 enables an operator to select an air flow based on fan blade RPM provided by the fan motor 76 and to select a power consumption consumed by the fan motor 76.

Both the air flow and the power consumption include a range of values to be described with respect to Table 1 as described herein. The selector 176 includes a plurality of air flow settings each of which can be selected by the operator to select a fan speed that provides a desired extraction of extraneous matter, including leafy trash, roots, dirt, and rocks, from the sugarcane mat. The selector also includes a plurality of power consumption settings that provides a power setting at which the fan motor operates. Once the air flow and power consumption are selected that match the user inputs, the controller determines a preferred angle of incidence of the fan blades and an airflow to meet the selected parameters of power consumption. Either one of or both of the air flow and power consumption are adjustable by the operator throughout the harvest to adapt to different crop conditions.

In another implementation, a desired extraction level of extracting extraneous matter is selected. Once selected, the controller determines the preferred angle of incidence of the fan blade. A select auto clean operator input 177 is set by the operator to select an auto-clean function which automatically cleans the sugarcane mat based on a cleaning load and/or the cleanliness of the sugarcane mat experienced by the fan motor 76 during cleaning. In an auto clean mode, the speed of motor is automatically set during cleaning to achieve a desired cleaning. Please see U.S. Pat. No. 10,091, 934, incorporated herein by reference, for one type of automatic cleaning system that is utilized upon selection of the auto clean operator input 127.

Additionally, a billet to crop debris ratio selector 178 is provided for the operator to select from a number of billets to crop debris ratios. In one implementation, the selector 178 includes two or more selector buttons, each of which includes a different ratio which the operator can select. For instance, in one implementation, one selector is for a ratio of 90% billet to 10% crop debris. A second selector in this implementation is for a ratio of 85% billet to 15% crop debris. In another implementation, the selector is a slider selector having a range of selections that are selected by a slider. In different implementations, the user interface 172 includes manually selectable buttons, a touch screen buttons, such as capacitive touch buttons or infrared touch buttons. Other types of selectors are contemplated.

The user interface 172 also includes a vane angle selector 180 which has two modes. A first mode is a manual mode to enable a user or operator to manually adjust a vane angle of the vanes 122 with respect to the housing. A second mode is an automatic mode to enable the user or operator to have the control system 150 to automatically adjust the angle of the vanes 122 based on fan blade angle of attack, which changes with a change to fan RPM. In different implementations, the fan blade angle of attack is adjusted based on fan RPM and/or fan blade angle of incidence. In other implementations, the angle of attack is considered to be static at a constant fan RPM with a fixed blade position. In another implementation, the fan blade angle of attack and fan blade speed is automatically adjusted by the control system 150. As described herein, the angle of attack is a calculated value based on the angle between the incoming airstream and a blade chord line. The blade chord line is the imaginary line from leading edge to the trailing edge. The angle of attack changes when the fan RPM and Blade Pitch are changed. In other implementations, the manual mode includes where a user or operator adjusts an angle of the vanes by hand. In this implementation, a lever or levers, is/are coupled to the vanes and the user operator manually adjusts the vane angle by adjusting the lever or levers to a desired position. In further implementations, the manual adjustment is made by an electronic actuator actuated by the user or operator using a pushbutton switch, a toggle switch, or other manually actuated switches.

In different implementations, when in the manual mode, user inputs include fan speed (RPM), blade angle of incidence, and guide vane angle. Selection of one or two of these manual inputs may result in adjustment of the other input(s) not selected. While guide vane angle is one of the inputs, selection of guide vane angle can result in multiple fan speeds in combination of multiple angles of incidence. In one implementation, an angle of attack is calculated by fan speed and fan blade angle of incidence to determine guide vane angle. In another implementation, for static blades or manual positioning of blades either by physical adjustment by an operator or in the manual mode selected through the user interface, the vane angle is 1) adjusted based on the blade position and 2) subsequently adjusted based on the speed of the fan.

The vane angle, which is selected either manually or automatically, is adjusted by a guide vane actuator 182 under control of the controller 152. A guide vane angle sensor 184 identifies the angle of the guide vanes 122.

Figure 5:
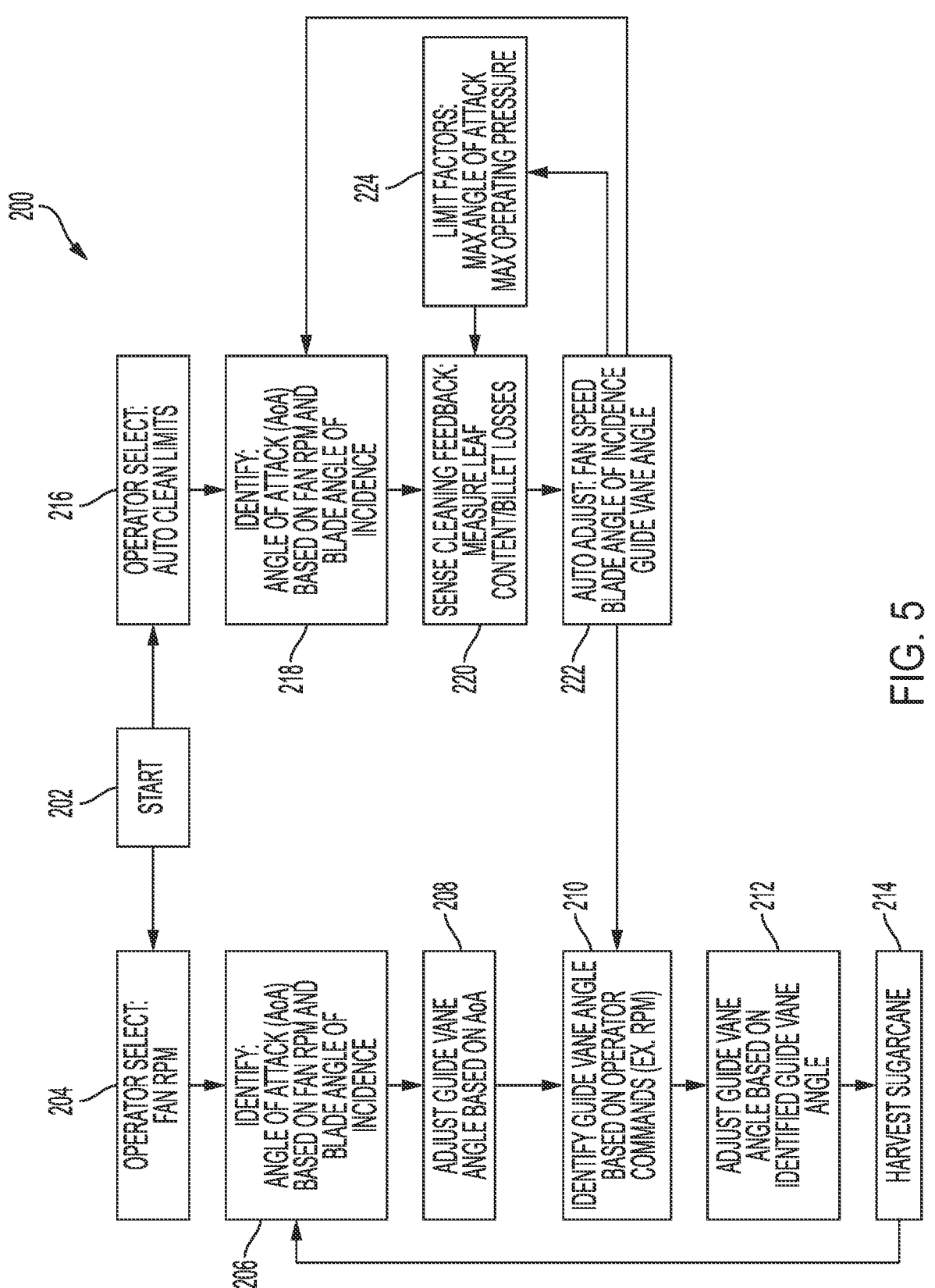
FIG. 5 illustrates a block flow diagram of a process for a sugarcane cleaning operations.

FIG. 5 shows a block diagram 200 of a process for a cleaning operation of the sugarcane harvester 20. Upon starting the vehicle 20 at start operation 202, the operator selects from one of two cleaning operations. In one operation, the operator selects at block 204 a manual mode from the user interface 180. The operator selects a fan speed, i.e. revolutions per minute, based on fan speed indicator displayed at the user interface 180 or through the use of a toggle feature where fan speed is continuously adjustable as opposed to being discretely adjusted. In one implementation, for example, the fan speeds are identified as predetermined values such as 500, 600, and 700 rpm. In a second operation, the operator selects an auto clean operation at block 206 that works in tandem with operator selected values of air flow and power consumption, in at least one implementation.

If the operator selects manual adjustment of the fan speed, the controller 152, at block 206, identifies the angle incidence of the fan blades 104 as well as the angle of incidence of the fan blades identified by the blade angle of incidence sensor 166. Once identified, the angle of the guide vanes is adjusted at block 208. The guide vane angle sensor 184 identifies the angle of the guide vanes 122, which is used to adjust the position of the guide vanes based on the angle of attack of the fan blades 104. At this point, the controller, at block 210, determines or identifies a guide vane angle based on the operator commands, including the fan blade speed at block 204 and vehicle speed. The controller determines the guide vane angle based on a lookup table stored in the memory 156. The lookup table includes a plurality of different fan speeds and a related guide vane angles for each speed to achieve a desired crop cleaning/billet loss level. Because the fan speed and the vehicle speed constantly change under the load of harvesting, the identification of guide vane angle is constantly updated and the guide vane angle is updated based on the current identification of guide vane angle. Guide vane angle, in this and other implementations, is constantly adjusted based on the changing fan speeds.

Once the guide vane angle is identified, the controller 152 adjusts the positions of the guide vanes to the identified angle at block 212. Once adjusted, the sugarcane is harvested using the adjusted guide vane position at block 214. As the sugarcane is being harvested, the process returns to block 206 to continue adjustment of the angles of the guide vanes.

Initially or while harvesting, the operator may select auto clean limits at block 216. If so, the controller 152 begins a startup self-cleaning operation including determining a baseline load on the motor 76 with the motor load sensor 160 when the harvester 20 is running and no crop is being cut, and a current load when crop is being cut. These values are used in the automatic cleaning process disclosed in the U.S. Pat. No. 10,091,934. Once the fan load and the airflow are identified, the controller 152 receives a cleaning feedback signal from the chamber cleaning sensor or the elevator cleaning sensor, such as a video camera. 164 to determine leaf content and billet losses in the sugarcane mat. Based on this cleaning feedback signal, the fan speed is changed according to the fan speed determined by the automatic cleaning adjustment. Once the fan speed is set, the controller 152 identifies the angle of attack based on the fan speed and the blade angle of incidence at block 218. Using the cleaning feedback signal, the leaf content and billet losses are sensed and identified at block 220. Once the leaf content and billet losses are identified, an automatic adjustment is made the fan speed, the blade angle of incidence, and the angle of the guide vanes at block 222.

The angle of incidence and fan speed (fan rpm) are adjusted based on auto clean limits and power consumption requirements. In one implementation, the value of blade angle of incidence based on airflow and fan power consumption range is identified in a lookup table stored in memory 156. In other implementations, the lookup table is supported by or replaced by software instructions configured to calculate the value of blade angle of incidence. In one implementation, the value of blade angle of incidence is continuously updated and applied to the fan. In one implementation, the lookup table provides recommended or predetermined airflow and power consumption ranges for a specific amount of sugarcane being harvested, also identified as a specific tonnage.

The automatic adjustment of the fan speed, the blade angle of incidence, and the angle of the guide vanes, is made on a continuing basis during the harvest operation while in

16 feedback is determined at block 222. In addition, the values of fan speed, blade angle of incidence, and the angle of the guide vanes made at block 222 are continuously monitored at block 224. Limit factors, which are stored in memory 156, are compared to the angle of attack as well as the maximum operating pressure. The stored limit factors, in one implementation, identify a maximum angle of attack and a maximum operating pressure. If the limit factors are close to being exceeded or are being exceeded the automatic cleaning system reduces the maximum angle of attack and a maximum operating pressure, or shuts off the cleaning operation to determine the cause of the limit factors being exceeded. In one or more implementations, preventing a maximum angle of attack is achieved by controlling fan speed and angle of incidence. Under some condition, maximum operating pressures can result even when operating below the maximum angle of attack due to excessive loading of the cleaning chamber. If maximum pressure or maximum angle of attack is achieved or is close to being achieved, one or more mechanisms to reduce maximum pressure or to reduce angle of attack are provided. Depending on the root cause of these conditions, one or more of these mechanisms include, but are not limited to, reducing fan speed, reducing angle of incidence, or reducing harvesting speed, each of which reduces the mass flow of crop, of air, or both, to avoid machine damage or breakage.

If at any time during the automatic cleaning operation, the controller 152 receives an operator command, the controller moves to block 210 to make adjustments to the guide vane angle based on the operator command.

As described herein, the angle of attack is a calculated value based the angle between the incoming airstream and the blade chord line. The blade chord line is the imaginary line from leading edge to the trailing edge. The angle of attack changes when the fan RPM and Blade angle of incidence are changed.

TABLE 1

| Optimal Airflow (CFM) | Machine Feed Rate (tons/hour) | Power Consumption @ Max Hydraulic Pressure (HP) | Angle of Incidence (degrees) | FAN RPM | Angle of Attack Limit (degrees) | Crop Cleaning/Billet Loss Levels |
|---|---|---|---|---|---|---|
| 30,000-32,460 | 40-52 | OPERATOR SET POINT PER HARVESTING PRACTICE | 12-25 | 600-1000 | <10 | OPERATOR SET POINT/MANUALLY MONITOR |
| 32,460-34,920 | 52-64 | OPERATOR SET POINT PER HARVESTING PRACTICE | 12-25 | 600-1000 | <10 | OPERATOR SET POINT/MANUALLY MONITOR |
| 34,920-37,380 | 64-76 | OPERATOR SET POINT PER HARVESTING PRACTICE | 12-25 | 600-1000 | <10 | OPERATOR SET POINT/MANUALLY MONITOR |
| 37,380-39,840 | 76-88 | OPERATOR SET POINT PER HARVESTING PRACTICE | 12-25 | 600-1000 | <10 | OPERATOR SET POINT/MANUALLY MONITOR |
| 39,840-42,300 | 88-100 | OPERATOR SET POINT PER HARVESTING PRACTICE | 12-25 | 600-1000 | <10 | OPERATOR SET POINT/MANUALLY MONITOR |
| 42,300- | 100- | OPERATOR SET POINT PER HARVESTING PRACTICE | 12-25 | 600-1000 | <10 | OPERATOR SET POINT/MANUALLY MONITOR | the automatic mode. Adjustment of these items is made, when required at block 218. As before, the sensed cleaning Table 1 illustrates an example of the content of a lookup table accessed by the controller 152 to determine a correction factor which is used to adjust the blade angle of incidence based on airflow, power consumption, and machine feed rate. The values in Table 1 provide examples for a particular type of fan blade having a predetermined blade angle of incidence. Consequently, the values in Table 1 can change based on the type of fan blade being used. In this implementation, the fan blade is single profile airfoil, and more specifically a GOE 417A. Other types of blades are contemplated and the use of such blades can alter the values in the chart of Table 1. As seen in Table 1, if the user selects a specific fan blade speed, the look up table relies on a range of fan blade speeds and determines which range of fan blade speeds includes the selected specific fan blade speed. In other implementations, the lookup tables includes different ranges of fan blade speeds.

Figure 6:
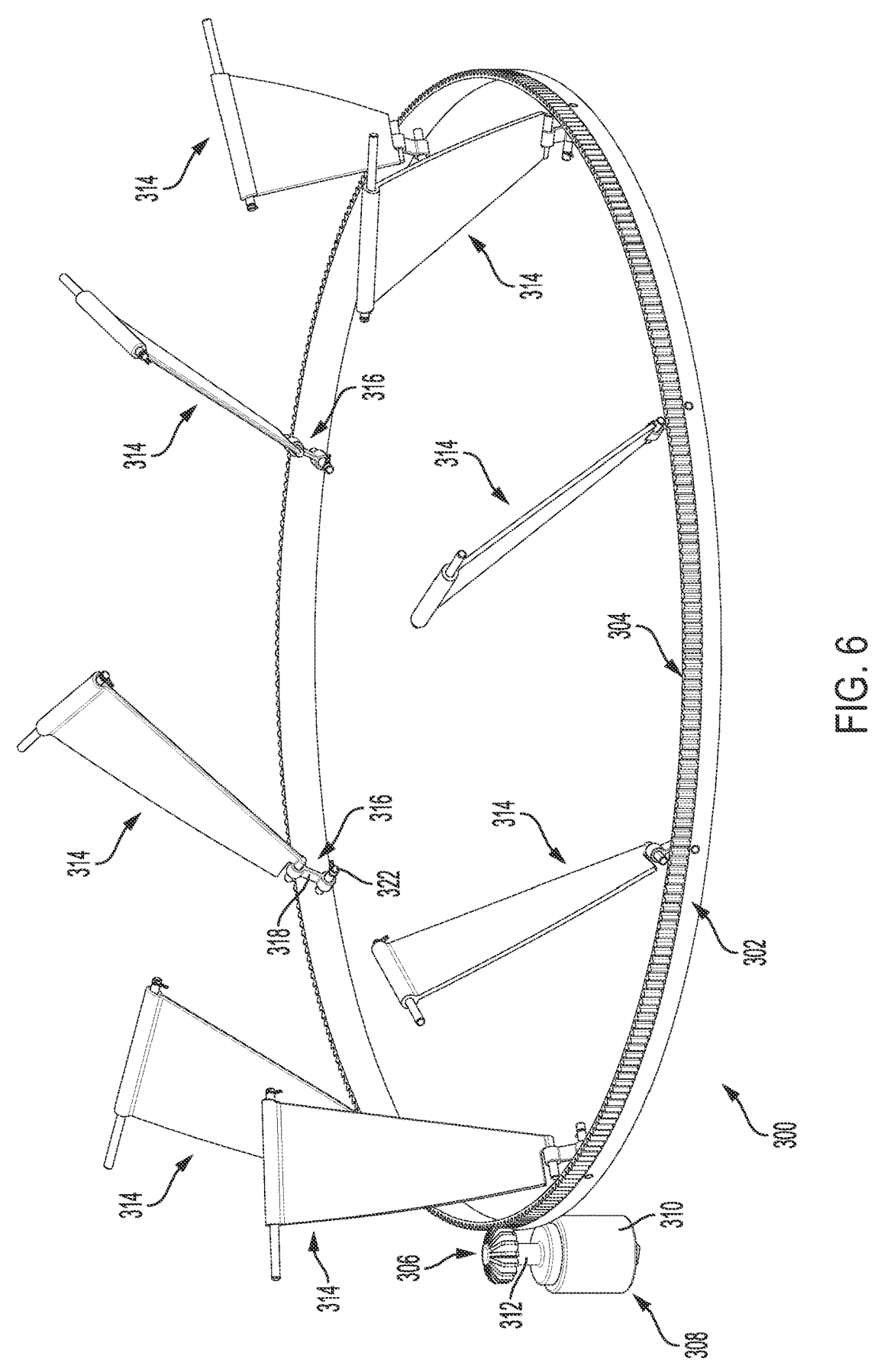
FIG. 6 illustrate a vane adjustment mechanism including adjustable vanes.

FIG. 6 illustrates a vane adjustment mechanism 300 similar to the vane adjustment mechanism 134 of FIG. 3. The vane adjustment mechanism 300 includes a ring 302 supported by a housing (not shown) such as housing 66 of the primary extractor 46 of FIG. 2. In this implementation, the ring 302 includes a plurality of teeth 304 which are located on a surface of the ring 302 in a direction toward the housing. The plurality of teeth 304 engage teeth 306 of an actuator 308, similar to the actuator 140 of FIG. 3. The actuator 308 includes a motor 310 having a driven spindle 312 coupled to a gear 314, which includes the teeth 306. The motor 310 is coupled to the controller 152 and responds to actuator signals provided by the controller 152.

Figure 7:
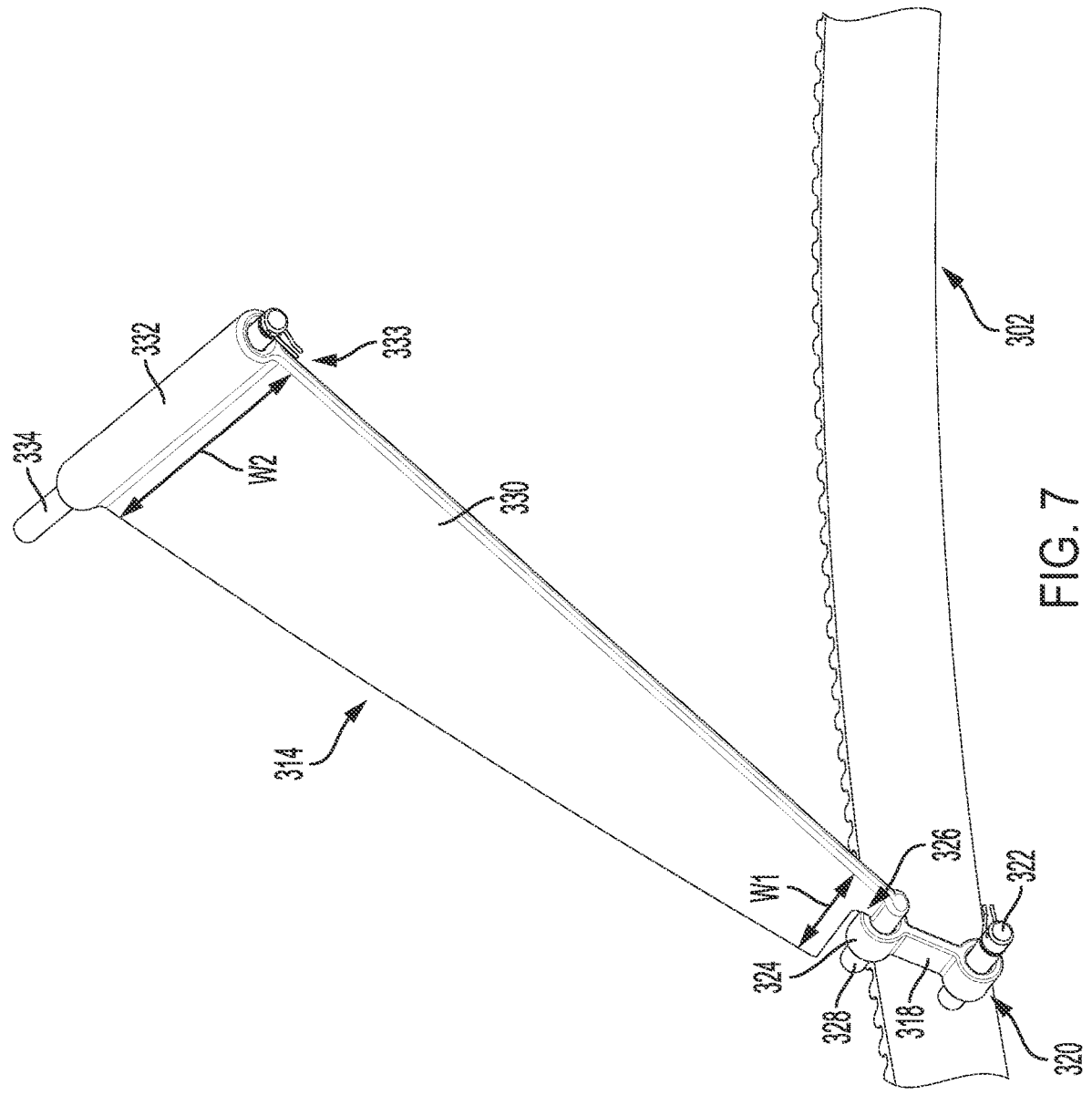
FIG. 7 illustrates one implementation of an adjustable vane.

A plurality of vanes 314 are rotatably connect to the ring 302 by a coupling mechanism 316 that includes a link 318. See also FIG. 7. The link 318 includes a first end 320 rotatably coupled to a first pin 322 that is fixedly connected to the ring 302. The first end 320 defines a cylinder having a channel or an aperture through which the pin 322 extends. The link 318 rotates about the pin 322.

The link 318 further includes a second end 324 which includes a cylinder defining an aperture. The aperture of the second end 324 rotatably supports a first end 326 of the vane 314. The first end 326 of vane 314 includes a link pin 328 fixedly connected to the first end 326 and which is rotatably supported by the second end 324 of the link 318. A blade 330 of the vane 314 extends between the link pin 328 and a link cylinder 332 fixedly connected to the blade 330 at a second end 333. The blade 330 includes opposed sides having surfaces which are generally parallel to one another. In one implementation, the blade 330 of the vane 314 includes a first width W1 at the first end 326 and a second width W2 at the second end 333, wherein the first width W1 is less than the second width W2. The link cylinder 332 defines an aperture or channel through which a housing pin 334 extends. The housing pin 334 is fixedly connected to the housing, such as housing 66, and extends through the link cylinder 332. In one or more implementations, the angle of each of the individual guide vanes is adjustable by the operator. In one alternative, the angles of one or more of the guide vanes are adjustable to provide a helical spin.

While adjustable vanes are illustrated to include a single shape or thickness, the vanes are not limited to a single shape, size, thickness, length, curvature, and profile. In addition, while a certain number of guide vanes are shown, the number of guide vanes is not limited to the described number but other numbers of guide vanes are contemplated. The same goes for the mechanical linkages used to adjust the position or control of vane angle. In some implementations, the angle of the vanes are individually controllable such that each vane is adjusted to a different angle. In other implementations, a first number of guide vanes are adjusted to a first angle and a second number of guide vanes are adjusted to a second angle. Guide vanes adjusted to the same angle may be consecutively located or alternated with guide vanes of a different angle. By being able to individually control the angle of each guide vane separately due to each vane being coupled to an individual motor, each vane can be oriented independently from the other guide vanes. In one implementation, each vane angle can be oriented in a random and unique angle that differs from the others resulting in unique and different airflows.

The angle of the vane 314 with respect to the ring 316 and therefore with respect to the fan blades, such as fan blades 104 of FIG. 3, is adjusted with rotation of the ring 302 driven by the actuator 308. Other vane angle adjustment mechanisms are contemplated.

Figure 8:
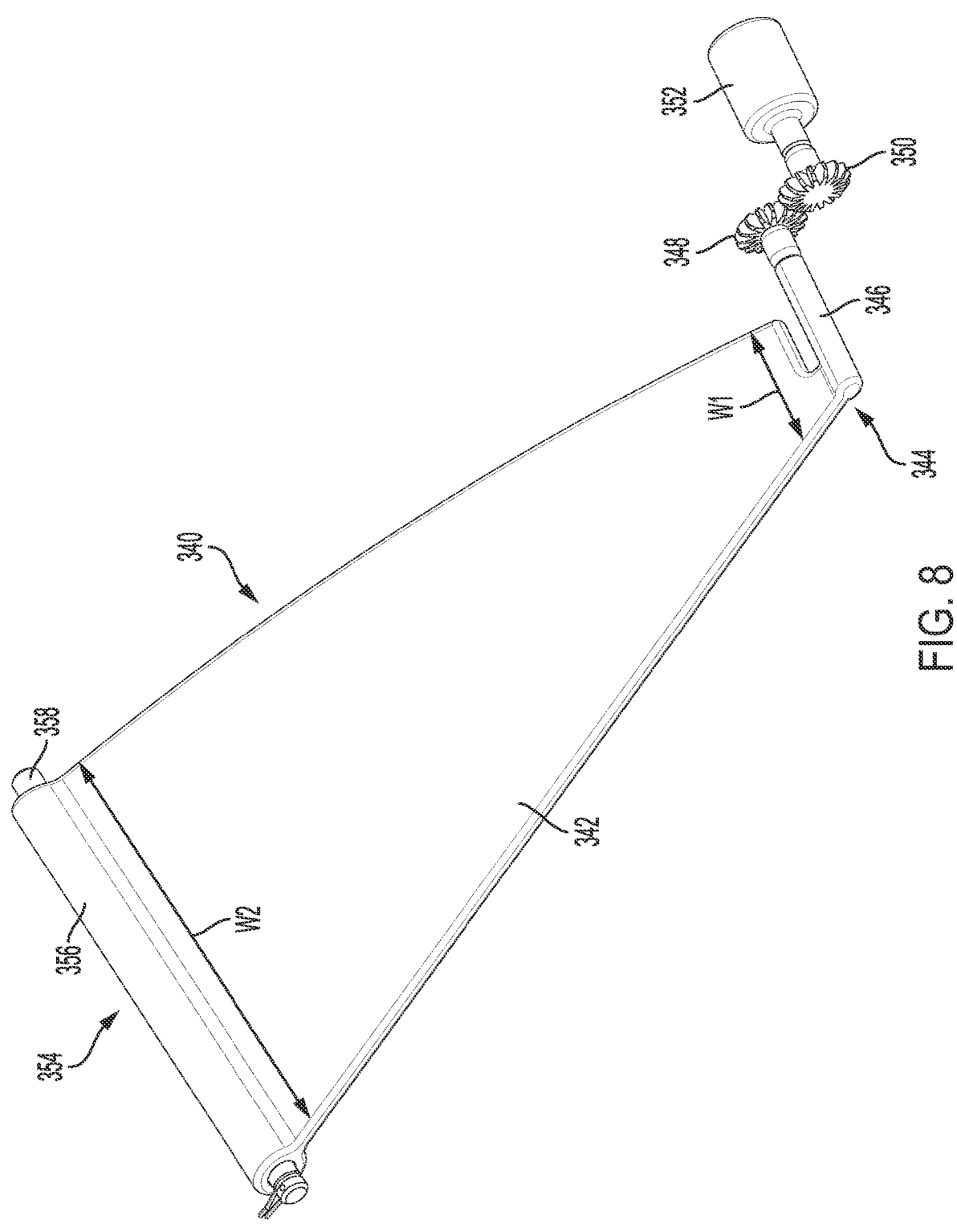
FIG. 8 illustrates another implementation of an adjustable vane.

FIG. 8 illustrates another implementation of a vane 340 that includes a blade 342. A first end 344 of the vane 340 includes a blade pin 346 fixedly connected to the vane 340. The blade pin 346 terminates with a gear 348 that engages a gear 350 driven by a motor 352. A second end 354 of the vane 340 includes a blade cylinder 356 that receives a pin 358 connected to the housing, such as housing 66. In both the implementation of the vane 314 of FIG. 7 and the vane 340, the driven ends of the blades have a width less than a width of the blade that is rotatably coupled respectively to the pins 334 or 358. In one implementation, each of the motors 352 is adjusted similarly, such that each of the vanes are all adjusted to the same positions. In other implementations, the motors 352 are controlled to adjust the angular positions of each of the vanes to a distinct position that is different than the angular positions other vanes. In further implementations, at the angle of least two of the total number of vanes is adjusted to same angle, and other vanes are adjusted to one or more other angles. In some implementations unique airflows are configured where each of the individual vanes is adjusted to different positions. In other implementations, a portion of the vanes is adjusted to the same positon, while other vanes are adjusted to other positions. In addition, in one or more implementations, the vanes are adjusted to provide a linear flow of material above the fan assembly or are adjusted to provide a helical or spinning flow of material above the fan assembly. This non-traditional vane orientation or non-symmetrical vane orientation provides previous unachievable airflows in the cleaning chamber of a sugarcane harvester. The resulting environment enhances debris extraction and promotes billet retention. This result is achieved with the individually controlled guide vanes where each vane has a separate motor/actuator.

Figure 9:
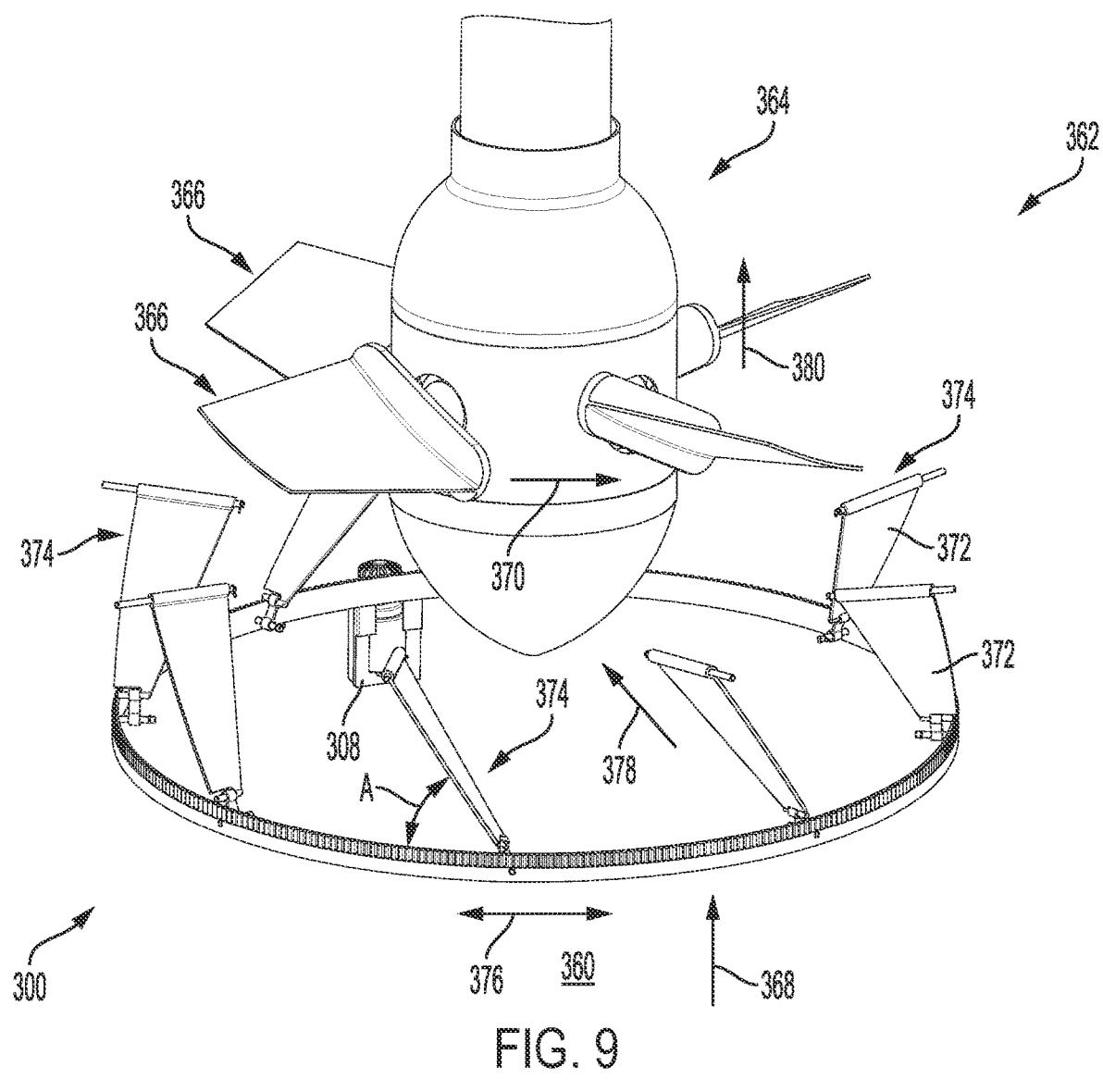
FIG. 9 illustrates a primary extractor including a vane adjustment mechanism located below fan blades of a fan assembly with vanes in a first position.

The function of the guide vanes 314 and 340 is to reduce or eliminate the air spin in the airflow entering or exiting the fan blades and in return reducing the rotational energy losses. Guide vanes can be placed either on the inlet or outlet side of the airflow depending on the application and duct geometry. As seen in FIG. 9, the guide vanes are located on an inlet side 360 of a primary extractor 362, which is illustrated without a hood. The vane adjustment mechanism 300 is located below a fan assembly 364 including blades 366 similar to the fan assembly 100 of FIG. 3. Incoming air flow moves upwardly toward the fan assembly 364 as illustrated by the arrow 368. The incoming air flow is produced by fan rotation of the fan assembly 364 in the direction illustrated by fan rotation arrow 370. The vanes 374 are inclined at an angle A with respect to the incoming airflow 268 and with respect to a horizontal line 376 along which the ring 302 is located within the housing. As the fan assembly 364 rotates, the blades 366 pull air through the vane adjustment mechanism 300 where the incoming airflow 368 contacts facing surfaces of a first side 372 of inlet vanes 374 disposed between the incoming air flow 368 and the blades 366. As the incoming air impacts the facing surfaces 372 of vanes 374, the vanes 374 direct the incoming airflow in the direction 378. In this implementation, the vanes 374 are disposed in a direction opposite the fan rotation 370 which provides a resultant output axial airflow in the direction of arrow 380. In this implementation, the resultant axial airflow 380 is generally parallel to incoming airflow 368

The resultant axial airflow 380 is directed toward a hood, which is not shown in FIG. 9 but which is similar to the hood of FIG. 2, as would be understood by one skilled in the art. In this implementation, the resultant axial airflow 380 reduces the amount of turbulence that can occur in primary extractors having fan assemblies that do not have adjustable vanes. Since turbulence within the hood generates a swirling flow within the hood that captures crop debris, control of the turbulence with adjustable vanes provides additional cleaning. As a result, the present disclosure provides one or more of: 1) less back pressure, 2) quicker emission of extraneous matter, and 3) less potential for crop residue to fall out of rotation or circulation, each of which can reduce the downward flow of matter leaving the hood by falling back towards the incoming billet mat. By reducing the downward flow of matter, upward flow is increased. In addition, the control of adjustable vanes optimizes fan performance and fuel savings.

Figure 10:
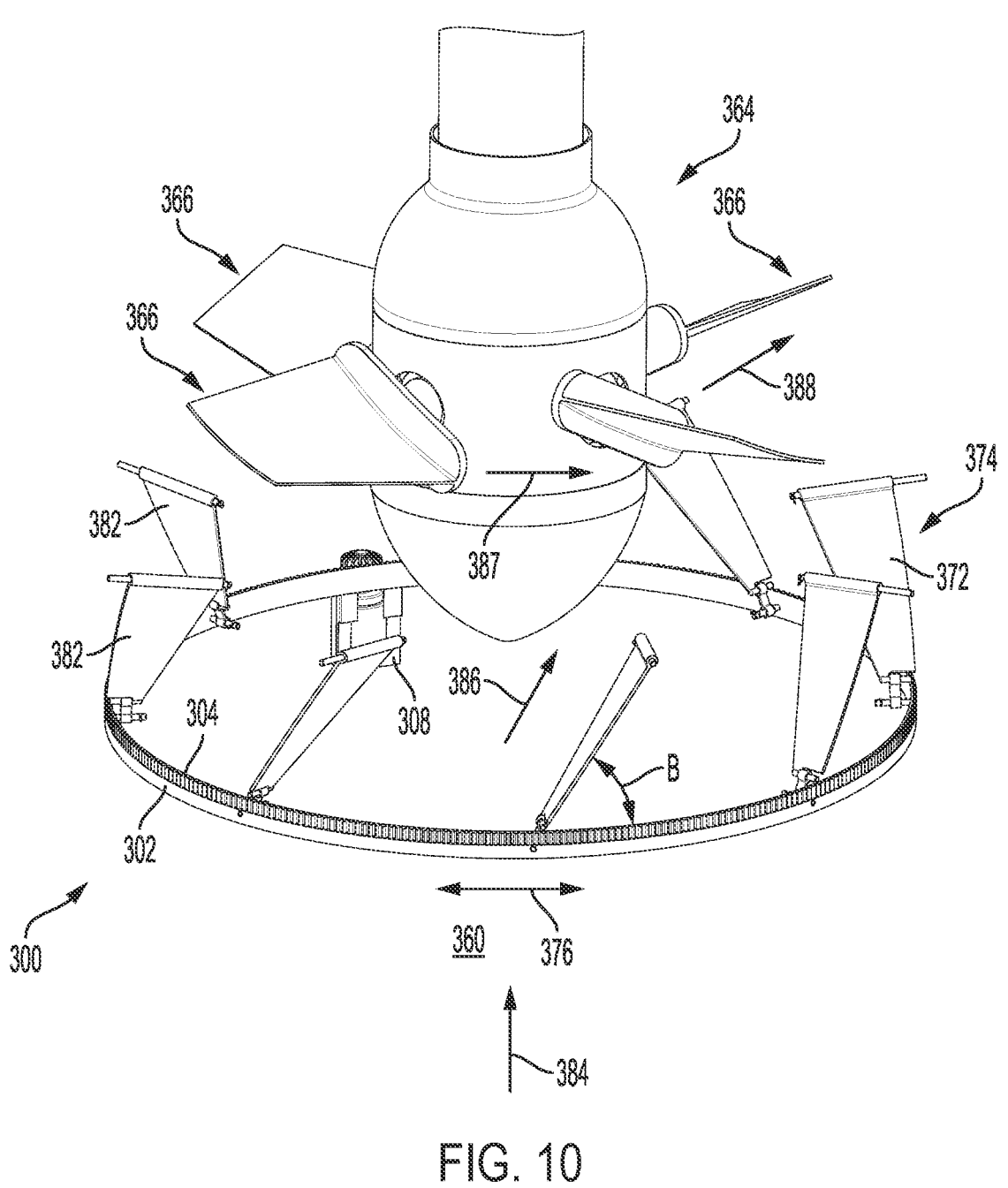
FIG. 10 illustrates a primary extractor including a vane adjustment mechanism located below fan blades of a fan assembly with vanes in a second position.

In another implementation of FIG. 10, the inlet vanes 374 are adjusted such that an opposite side of the inlet vanes, i.e., a second side 382, receives incoming airflow 384. The vanes 374 are inclined at an angle B with respect to the incoming airflow 384 and with respect to a horizontal line 376 along which the ring 302 is located within the housing. As the fan assembly 364 rotates, the incoming airflow 384 impacts the facing surfaces 382 of vanes 374. The vanes 374 direct the incoming airflow in the direction 386, which is in the same direction as fan rotation 387. A resultant helical airflow 388 is generated within the hood for the fan assembly 364.

Because the vanes are adjustable in either direction with respect to fan rotation, the resultant air flow is adjustable based on the angle of the guide vanes. This angle is selectable either manually by an operator based on an operator's selection of fan speed. In other implementations, the operator may make a selection of vane angle based on crop debris that is expelled from the hood. In this case, the operator viewing a display of the crop debris within the housing displayed at the display 124 determines an appropriate setting of the vanes. For instance, in one implementation, the chamber cleaning sensor 164 is a camera and the display 124 displays camera images. In different implementations, the images are still images or moving images. In other implementations, the controller 102 automatically adjusts the vane angle as described in FIG. 5. In other implementations, the display may provide a sensor output indicating an extent of billets hitting the hood or provide camera images of the elevators showing the extent of billet yield or residue content.

Figure 11:
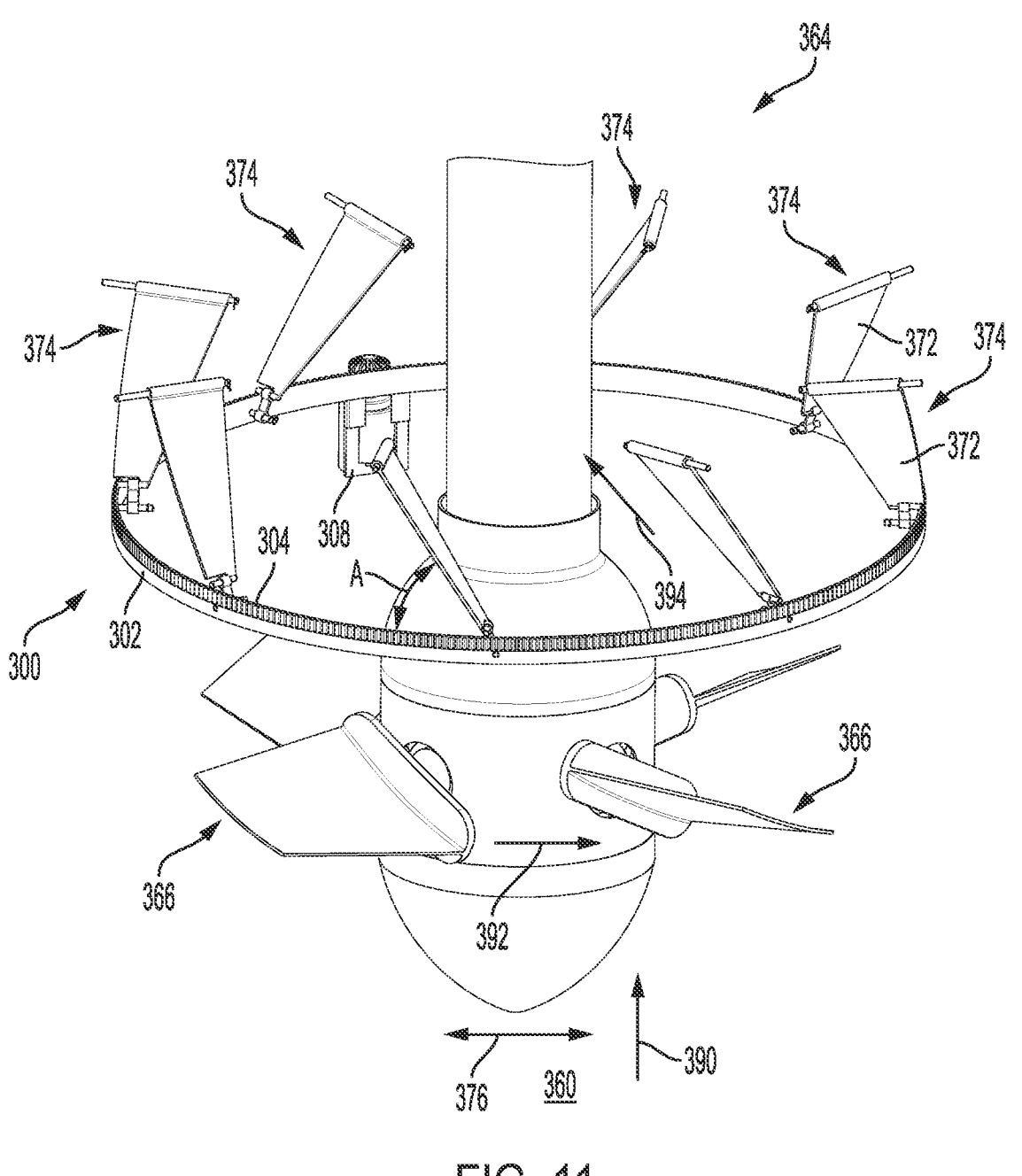
FIG. 11 illustrates a primary extractor including a vane adjustment mechanism located above fan blades of a fan assembly with vanes in a first position.

In another implementation of FIG. 11, the vane adjustment mechanism 300 is located above the fan blades 366. An incoming airflow 390, generated by the fan blades 366, is directed to the vanes 374 of the vane adjustment mechanism 300. The incoming airflow 390 is moved toward the vane adjustment mechanism 300 by the fan blades 366 rotating in a direction 392. The vanes 374 are inclined at an angle A with respect to the incoming airflow 390 and with respect to a horizontal line 376 along which the ring 302 is located within the housing. Airflow generated by the rotating fan blades 366 impacts the facing surfaces of first side 372 of inlet vanes 374 and is directed in an airflow pass direction 394 which is opposite fan rotation 392.

Figure 12:
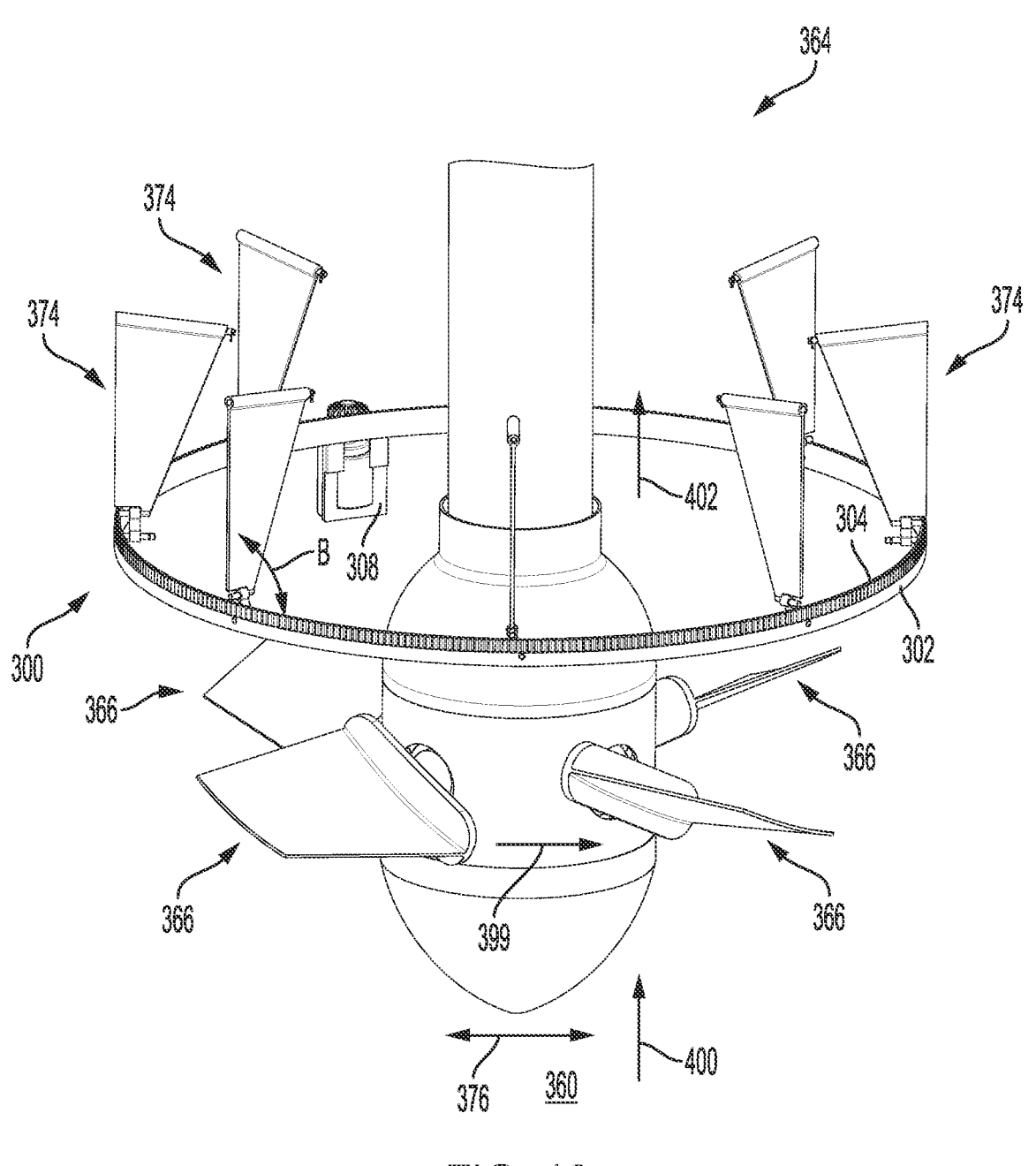
FIG. 12 illustrates a primary extractor including a vane adjustment mechanism located above fan blades of a fan assembly with vanes in a second position.

In a further implementation of FIG. 12, the vane adjustment mechanism 300 is located above the fan blades 366. An incoming airflow 400, generated by the fan blades 366, is directed to the vanes 374 of the vane adjustment mechanism 300. The vanes 374 are inclined at an angle B with respect to the incoming airflow 400 and with respect to a horizontal line 376 along which the ring 302 is located within the housing. In this implementation, the angle B is generally parallel to the incoming airflow 400. As the fan assembly 364 rotates in a direction 399, the incoming airflow 400 is directed along the both surfaces of the vanes 374 to direct the incoming airflow in a direction 402 which is also generally perpendicular to the line 376.

While the vanes illustrated in each of the figures are shown as being generally planar, in other implementations, one or more of the vanes includes a curve that is fixed or a curve (or bend) that is adjustable. For instance, in an alternative embodiment, the vanes 374 of FIG. 11 would be modified to include an upper portion that would be curved with respect to a lower portion of the vanes which are shown being coupled to the ring 302. In this implementation, incoming air flow 390 is redirected by the curved portion of the vanes. In other implementations, the vane 374 is a two piece vane having a lower portion coupled to the ring 302. An upper portion of the vane 374 is hingedly connected to the lower portion. By rotating the ring 302, an angle between the lower portion and the upper portion is adjusted to a desired position.

While exemplary implementations incorporating the principles of the present disclosure have been described hereinabove, the present disclosure is not limited to the described implementations. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A crop separator configured to process sugarcane, the crop separator comprising:
   a housing including an inlet and an outlet, the inlet configured to receive a sugarcane mat, having crop debris and billets, and the outlet configured to receive crop debris;
   a fan assembly located in the housing, wherein the fan assembly includes a plurality of fan blades coupled to a spindle;
   a motor configured to rotate the plurality of fan blades about a rotational axis of the spindle;
   a vane assembly including an actuator system and a plurality of guide vanes operatively connected to the actuator system, wherein the actuator system is adapted to adjust an angle of each of the plurality of guide vanes;
   a controller operatively connected to the motor and to the vane assembly, the controller including a processor and a memory, wherein the memory is configured to store program instructions and the processor is configured to execute the stored program instructions to:
      identify a rotational speed of the plurality of fan blades;
      identify an angle of incidence of the plurality of fan blades;

identify an angle of attack of the plurality of fan blades based on the identified rotational speed of plurality of fan blades and the identified angle of incidence of the plurality of fan blades; and adjust the angle of the each of the plurality of guide vanes to optimize fan performance for cleaning and fuel savings.

2. The crop separator of claim 1, wherein the motor rotates the plurality of blades to generate a rotational air flow in a first direction.

3. The crop separator of claim 2 wherein the stored program instruction of adjust the angle of each of the plurality of guide vanes includes adjust the angle to a position generating an air flow in a direction the same as or opposite to the rotational air flow in the first direction.

4. The crop separator of claim 1 further comprising a user actuator, wherein the user actuator includes manual position and an automatic position.

5. The crop separator of claim 4 wherein the manual position enables an operator to manually select the fan speed.

6. The crop separator of claim 5 wherein in response to the manually selected fan speed, the processor accesses a lookup table stored in memory that identifies a vane angle associated with the selected fan speed.

7. The crop separator of claim 6 wherein when upon selection of the automatic position, the controller, based on the identified blade angle of incidence adjusts the vane angle to the identified vane angle.

8. The crop separator of claim 4 wherein the processor, in response to selection of the manual position to select a fan speed, identifies a static fan blade speed and accesses a lookup table stored in memory that identifies a vane angle associated with the static fan blade speed.

9. The crop separator of claim 4 wherein the automatic position enables the controller to engage an auto clean operation which provides automatically adjusted fan speed based on a cleanliness of billets.

10. The crop separator of claim 9 wherein the processor is configured to execute the stored program instructions to: adjust the angle of incidence of one or more of the plurality of fan blades based on the automatically adjusted fan speed and a power consumption range.

11. A sugarcane harvester for harvesting sugarcane, the harvester comprising:

a cutter configured to cut sugarcane into a sugarcane mat having crop debris and billets;

an extractor operatively connected to the cutter, the extractor including a fan housing having an inlet configured to receive the sugarcane mat and an outlet configured to discharge crop debris from the sugarcane mat, and a fan located in the fan housing to move the crop debris through the fan housing, the fan including a motor, fan blades rotatably coupled to the motor, and a vane assembly including an actuator system and a plurality of guide vanes operatively connected to the actuator system, wherein the actuator system is adapted to adjust an angle of each of the plurality of guide vanes;

an elevator operatively connected to the extractor to discharge billets from the extractor;

a user interface having user selectable controls, wherein the user selectable controls include a manual position to enable an operator to manually adjust a rotational speed of the fan blades and an automatic position for automatically adjusting rotational speed of the fan blades;

a controller operatively connected to the user interface, the motor, and to a blade angle of incidence mechanism, the controller including a processor and a memory, wherein the memory is configured to store program instructions and the processor is configured to execute the stored program instructions to:

identify a rotational speed of the fan blades; and adjust the angle of the each of the plurality of guide vanes to optimize fan performance for cleaning and fuel savings based on the identified rotational speed of the fan blades.

12. The sugarcane harvester of claim 11 wherein the processor, in response to selection of the manual position of one of the blade angle of incidence or the fan blade speed, identifies the other of the blade angle of incidence or the a fan blade speed and accesses a lookup table stored in the memory that identifies a vane angle associated with the static fan blade speed.

13. The sugarcane harvester of claim 11 wherein the manual position enables an operator to manually select the fan speed.

14. The sugarcane harvester of claim 13 wherein in response to the manually selected fan speed, the processor accesses a lookup table stored in the memory that identifies a vane angle associated with the selected fan speed and the controller, based on the identified vane angle, adjusts the vane angle to the identified vane angle.

15. The sugarcane harvester of claim 11 wherein the automatic position enables the controller to engage an auto clean operation which provides an automatically adjusted fan speed based on a cleanliness of billets.

16. The sugar cane harvester of claim 15 wherein the processor is configured to execute the stored program instructions to: adjust the angle of incidence of one or more of the plurality of fan blades based on the automatically adjusted fan speed and a power consumption range.

17. A method of harvesting sugarcane from a field with a sugarcane harvester, the method comprising:

cutting sugarcane from the field to obtain a sugarcane mat of cut stalk and crop residue;

delivering the cut stalk and the crop residue to a fan housing of the sugarcane harvester, the fan housing supporting an extractor fan having fan blades;

identifying a position of a user actuator, wherein the user actuator includes a manual position and an automatic position;

determining the rotational speed of fan blades of the extractor fan;

if the user actuator is in the manual position, adjusting an angle of one or more of a plurality of adjustable guide vanes based on the rotational speed of the extractor fan or adjusting the rotational speed of the fan blades if the guide vanes are static guide vanes; and if the user actuator is in the automatic position, adjusting one of or both of an angle of incidence of the fan blades or a fan speed of the extractor fan, and based on the adjusted angle of incidence of the fan blades and the adjusted fan speed, adjusting an angle of a plurality of guide vanes.

18. The method of claim 17 further wherein if the user actuator is in the automatic position, adjusting the rotational speed of the extractor fan based on a cleanliness of billets.

19. The method of claim 18 further wherein if the user actuator is in the manual position, the manual position enables an operator to manually select the fan speed and upon selection of the fan speed, adjusting an angle of the guide vanes based on the selected fan speed and the adjusted angle of incidence of the fan blades.

\* \* \* \* \*